(12) United States Patent
Liu et al.

(10) Patent No.: US 11,974,257 B2
(45) Date of Patent: Apr. 30, 2024

(54) TIME DOMAIN RESOURCE ALLOCATION METHOD AND APPARATUS

(71) Applicant: ZTE CORPORATION, Shenzhen (CN)

(72) Inventors: Xing Liu, Shenzhen (CN); Peng Hao, Shenzhen (CN); Xianghui Han, Shenzhen (CN); Zhisong Zuo, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 509 days.

(21) Appl. No.: 17/281,134

(22) PCT Filed: Sep. 19, 2019

(86) PCT No.: PCT/CN2019/106579
§ 371 (c)(1),
(2) Date: Mar. 29, 2021

(87) PCT Pub. No.: WO2020/063428
PCT Pub. Date: Apr. 2, 2020

(65) Prior Publication Data
US 2021/0360619 A1  Nov. 18, 2021

(30) Foreign Application Priority Data
Sep. 28, 2018 (CN) .................. 201811141910.6

(51) Int. Cl.
*H04W 72/04* (2023.01)
*H04W 56/00* (2009.01)
(Continued)

(52) U.S. Cl.
CPC ..... *H04W 72/0446* (2013.01); *H04W 56/001* (2013.01); *H04W 72/0453* (2013.01); *H04W 72/23* (2023.01)

(58) Field of Classification Search
CPC ........... H04W 72/0446; H04W 56/001; H04W 72/23; H04W 72/0453; H04L 5/001; H04L 5/0053; H04L 5/0092
See application file for complete search history.

(56) References Cited

U.S. PATENT DOCUMENTS

2020/0163050 A1\* 5/2020 Lee .................. H04W 48/12
2021/0368527 A1\* 11/2021 Lin .................. H04W 72/23

FOREIGN PATENT DOCUMENTS

CN   107949064 A   4/2018
CN   108401526 A   8/2018
(Continued)

OTHER PUBLICATIONS

International Search Report issued Dec. 4, 2019 re: Application No. PCT/CN2019/106579, pp. 1-3, citing: CN 108496317 A, CN 107949064 A, CN 108401533 A, CN 108401526 A and WO 2018139892 A1.

(Continued)

*Primary Examiner* — John D Blanton
(74) *Attorney, Agent, or Firm* — CANTOR COLBURN LLP

(57) ABSTRACT

Provided are a time domain resource allocation method and apparatus. The method includes the following operations. A terminal acquires at least one of first information including search space configuration information, control resource set (CORESET) configuration information, and a bandwidth part type. A PDSCH time domain resource allocation table is subsequently determined according to the first information and a multiplexing pattern between a synchronization signal/physical broadcast channel block (SSB) and a CORESET.

16 Claims, 2 Drawing Sheets

Acquiring at least one of the following first information: search space configuration information, control resource set (CORESET) configuration information, and a bandwidth part type — S302

Determining a physical downlink shared channel (PDSCH) time domain resource allocation table to be applied to a PDSCH, wherein the PDSCH time domain resource allocation table has a correspondence with the first information and a multiplexing pattern between a synchronization signal/physical broadcast channel block (SSB) and a control resource set (CORESET) — S304

(51) Int. Cl.
*H04W 72/0446* (2023.01)
*H04W 72/0453* (2023.01)
*H04W 72/23* (2023.01)

(56) References Cited

FOREIGN PATENT DOCUMENTS

| CN | 108401533 A | 8/2018 |
|---|---|---|
| CN | 108496317 A | 9/2018 |
| WO | 2018139892 A1 | 8/2018 |

OTHER PUBLICATIONS

AT&T, "Remaining details on POSCH time domain resource allocation", 3GPP, R1-1809060, Page all, Aug. 11, 2018.

CA Office Action for corresponding application 3114639, Report dated Mar. 31, 2022.

CATT, "Remaining issues on time domain resource allocation", 3GPP Draft, R1-1806299, Page all, http://www.3gpp.org/ftp/Meetings%5F3GPP%5FSYNC/RAN1/Docs/,May 20, 2018 (May 20, 2018).

Ericsson, "Outcome of offline discussion on 7.1.3.3 (resource allocation)—part II", 3GPP Draft, R1-1809928, Page all, Mar. 31, 2022 (Mar. 31, 2022)3,114,639 Aug. 23, 2018.

European Search Report for corresponding application EP19 86 4224: Report dated Oct. 21, 2022.

Nokia et al., "Remaining issues on resource allocation and UE processing times", 3GPP Draft, R1-1809392, Page all,http://www.3gpp.org/ftp/tsg%5Fran/WG1%5FRL1/TSGR1%5F94/Docs/R1%2D1809392%2Ezip, Aug. 10, 2018 (Aug. 10, 2018).

* cited by examiner

TIME DOMAIN RESOURCE ALLOCATION METHOD AND APPARATUS

CROSS REFERENCE

This application is a National Stage Filing of the PCT International Application No. PCT/CN2019/106579 filed on Sep. 19, 2019, which claims priority to Chinese Application No. 201811141910.6 filed on Sep. 28, 2018, the entirety of which is herein incorporated by reference.

TECHNICAL FIELD

Embodiments of the present disclosure relate to, but are not limited to, the field of communications.

BACKGROUND

With the continuous development of wireless technologies, a large number of wireless services emerge. However, spectrum resources that the wireless services rely on are limited. With the continuous increase of people's requirements on bandwidth, spectrum resources between 300 Mhz to 3 GHz mainly used in conventional commercial communications are extremely insufficient, failing to meet the requirements of future wireless communications.

In future wireless communications, a carrier frequency (e.g., 28 GHz, 45 GHz, etc.) higher than that used by the 4th generation (4G) communication system will be used for communication. Such a high frequency channel has several defects, for example, the high frequency channel has large free propagation loss, and is easy to be absorbed by oxygen and affected by rainfall attenuation, which severely affect the coverage performance of the high frequency communication system. In order to ensure the high frequency communication to have similar SINR as the LTE system coverage, it is necessary to ensure antenna gain of high frequency communication. Since a carrier frequency corresponding to high frequency communication has a shorter wavelength, it can be ensured that more antenna elements can be accommodated in a unit area, and the large number of antenna elements enable the adoption of a beamforming method to improve antenna gain, thereby ensuring coverage performance of high frequency communication.

After the beamforming method is used, a transmitting device can concentrate the transmitting energy in a certain direction, leaving very little or no energy in other directions. That is, each beam has its own directivity, and each beam can only cover terminals in a certain direction, which means that the transmitting device, i.e. a base station, needs to transmit a plurality of beams to complete omnidirectional coverage. Typically, the number of beams is several tens or even hundreds. In order to satisfy access requirements of terminals that may occur in each direction, omnidirectional coverage of a system broadcast message needs to be implemented, and a communication station needs to repeatedly send the same system broadcast message in each beam direction. For the communication station, there is a problem of increasing of the "absolute overhead" of the system broadcast message.

For the problem in the related art that the time domain resource allocation solution for a physical downlink shared channel is incomplete, there is no effective solution at present.

SUMMARY

Embodiments of the present disclosure provide a time domain resource allocation method and apparatus.

According to an embodiment of the present disclosure, a time domain resource allocation method is provided, including: acquiring at least one of the following first information: search space configuration information; control resource set (CORESET) configuration information; and a bandwidth part type; determining a physical downlink shared channel (PDSCH) time domain resource allocation table to be applied to a PDSCH, wherein the PDSCH time domain resource allocation table has a correspondence with the first information and a multiplexing pattern between a synchronization signal/physical broadcast channel block (SSB) and a control resource set (CORESET).

According to another embodiment of the present disclosure, a time domain resource allocation method is provided, including: indicating at least one of the following first information: search space configuration information, control resource set (CORESET) configuration information, and a bandwidth part type; indicating PDSCH time domain resource allocation in a PDSCH time domain resource allocation table that has a correspondence with the first information and a multiplexing pattern between a synchronization signal/physical broadcast channel block (SSB) and a control resource set (CORESET).

According to another embodiment of the present disclosure, a time domain resource allocation apparatus is provided, including: an acquiring module, configured to acquire at least one of the following first information: search space configuration information; control resource set (CORESET) configuration information; and a bandwidth part type; a determining module, configured to determine a physical downlink shared channel (PDSCH) time domain resource allocation table to be applied to a PDSCH, wherein the PDSCH time domain resource allocation table has a correspondence with the first information and a multiplexing pattern between a synchronization signal/physical broadcast channel block (SSB) and a control resource set (CORESET).

According to another embodiment of the present disclosure, a time domain resource allocation apparatus is provided, including: a first indicating module, configured to indicate at least one of the following first information: search space configuration information, control resource set (CORESET) configuration information, and a bandwidth part type; a second indicating module, configured to indicate PDSCH time domain resource allocation in a PDSCH time domain resource allocation table that has a correspondence with the first information and a multiplexing pattern between a synchronization signal/physical broadcast channel block (SSB) and a control resource set (CORESET).

According to another embodiment of the present disclosure, a storage medium is provided. The storage medium stores a computer program, wherein the computer program is configured to execute the operations in any one of the method embodiments at runtime.

According to another embodiment of the present disclosure, provided is an electronic device, including a memory and a processor. The memory stores a computer program, and the processor is configured to run the computer program so as to execute the operations in any one of the method embodiments.

BRIEF DESCRIPTION OF THE DRAWINGS

The accompanying drawings described herein are used to provide a deeper understanding of the present disclosure, and constitute a part of the present application. The exemplary embodiments of the present disclosure and the description thereof are used to explain the present disclosure. The drawings and the exemplary embodiment do not constitute limitations to the present disclosure. In the drawings.

DETAILED DESCRIPTION OF THE EMBODIMENTS

The present disclosure is described below in detail with reference to the drawings and in conjunction with the embodiments. It is to be noted that embodiments in the present application and characteristics in the embodiments may be combined to derive other embodiments not explicitly described.

It is to be noted that the terms "first", "second" and the like in the specification, the claims and the drawings of the present disclosure are used to distinguish similar objects, and are not used to describe a specific sequence or a precedence order.

Figure 1:
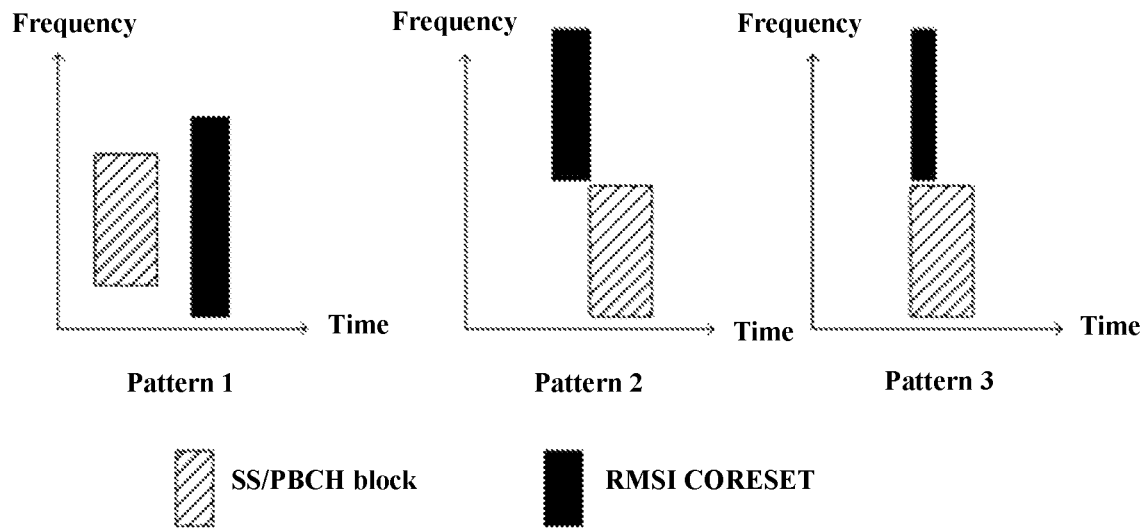
FIG. 1 is a schematic diagram of an RMSI transmission scheme according to the related art.

In the new generation wireless communication system, i.e., new radio (NR), system information is divided into minimum system information (SI) and other SI (OSI). The minimized system information is further divided into "master information block (MIB)" carried on a physical broadcast channel (PBCH) and "remaining minimum SI (RMSI)" carried on a physical downlink shared channel (PDSCH). The RMSI is carried on a PDSCH and is scheduled by a corresponding PDCCH. The master information block is used for providing basic system parameters of a cell. The remaining minimum system information is used for providing configuration information related to initial access, such as a sending configuration of an initial access request and a receiving configuration of an initial access response message. Other system information that needs to be broadcast is referred to as other system information (OSI). With regard to the transmission of an RMSI, FIG. 1 is a schematic diagram of an RMSI transmission scheme according to the related art. As shown in FIG. 1, the standard supports time division multiplexing or frequency division multiplexing between an RMSI and a synchronization signal/physical broadcast channel block (SS/PBCH block, abbreviated as SSB), and the multiplexing can be performed in three modes, i.e., pattern1, pattern2 and pattern3. The term "frequency" represents a frequency domain, and the term "time" represents a time domain. With regard to the described three different multiplexing patterns, the restriction of corresponding PDSCH time domain resource allocation is different, and therefore three default PDSCH time domain resource allocation tables are defined in the standard, which are respectively used for PDSCH time domain resource allocation of an RMSI PDSCH under the three multiplexing patterns.

Embodiments of the present disclosure provide a mobile communication network (including but not limited to a 5th generation (5G) mobile communication network). The network architecture of the network may include a network side apparatus (such as a base station) and a terminal. The embodiment provides a time domain resource allocation method operable on the described network architecture. It should be noted that, the operating environment of the described time domain resource allocation method provided in the embodiments of the present disclosure is not limited to the described network architecture.

Figure 2:
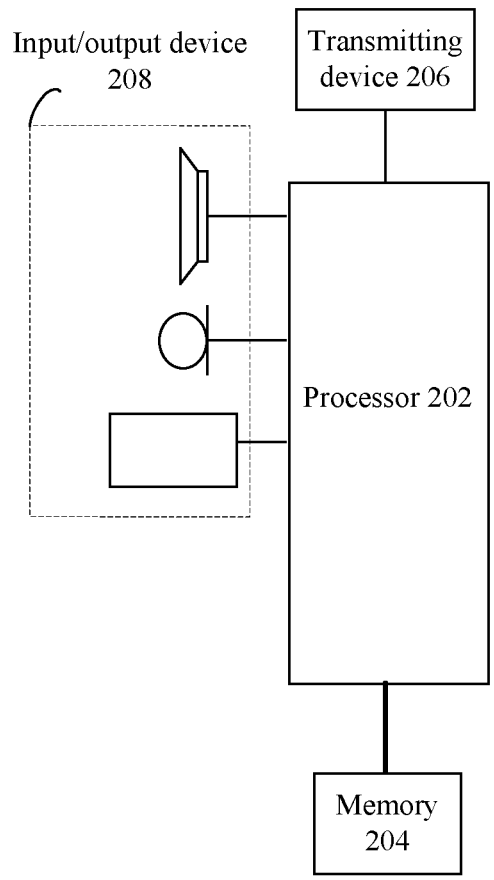
FIG. 2 is a hardware structure block diagram of a mobile terminal in a time domain resource allocation method according to an embodiment of the present disclosure.

The method embodiments provided in the present disclosure may be implemented in a mobile terminal, a computer terminal, or a similar computing apparatus. Taking operation on a mobile terminal as an example, FIG. 2 is a hardware structure block diagram of a mobile terminal in a time domain resource allocation method according to an embodiment of the present disclosure. As shown in FIG. 2, the mobile terminal may include one or more processors 202 (only one is shown in FIG. 2) (the processors 202 may include but are not limited to processing apparatuses such as a microprocessor MCU or a programmable logic device FPGA) and a memory 204 configured to store data. In some embodiments, the foregoing mobile terminal may further include a transmission apparatus 206 and an input/output device 208 that are configured to perform a communication function. A person having ordinary skill in the art may understand that the structure shown in FIG. 2 is merely exemplary, and does not limit the structure of the foregoing mobile terminal. For example, the mobile terminal may further include more or fewer components than shown in FIG. 2, or have a different configuration from that shown in FIG. 2.

The memory 204 may be used for storing software programs and modules of application software, such as program instructions/modules corresponding to the time domain resource allocation method in the embodiments of the present disclosure, and the processor 202 executes various functional applications and data processing by running the software programs and modules stored in the memory 204, thereby realizing the described method. Memory 204 may include high-speed random access memory, and may also include non-volatile memory, such as one or more magnetic storage devices, flash memory, or other non-volatile solid-state memory. In some instances, memory 204 may further include memory remotely located with respect to processor 202, which may be connected to mobile terminals over a network. Examples of such networks include, but are not limited to, the Internet, intranets, local area networks, mobile communication networks, and combinations thereof.

The transmitting device 206 is configured to receive or transmit data via one network. Specific examples of the described network may include a wireless network provided by a communication provider of the mobile terminal. In one example, the transmitting device 206 may include a Network Interface Controller (NIC) that may be coupled to other network devices via a base station to communicate with the Internet. In one example, the transmitting device 206 may be a Radio Frequency (RF) module that is used to communicate wirelessly with the Internet.

The solutions in the embodiments of the present disclosure may be applied between two communication nodes, such as between a base station and a terminal.

When the terminal is not configured with a PDSCH time domain resource allocation table, the solution provided in the embodiments of the present disclosure can be used to perform time domain resource allocation on a physical downlink shared channel. While when a physical downlink shared channel (PDSCH) time domain resource allocation table is configured for a PDSCH, the configured PDSCH time domain resource allocation table is preferably used for resource allocation, that is, when a PDSCH is configured with a pdsch-TimeDomainAllocationList, the pdsch-TimeDomainAllocationList is used as the PDSCH time domain resource allocation table.

Three default PDSCH time domain resource allocation tables A, B and C defined in the standard in the related art are respectively applied to three cases, i.e., pattern1, pattern2 and pattern3.

Figure 3:
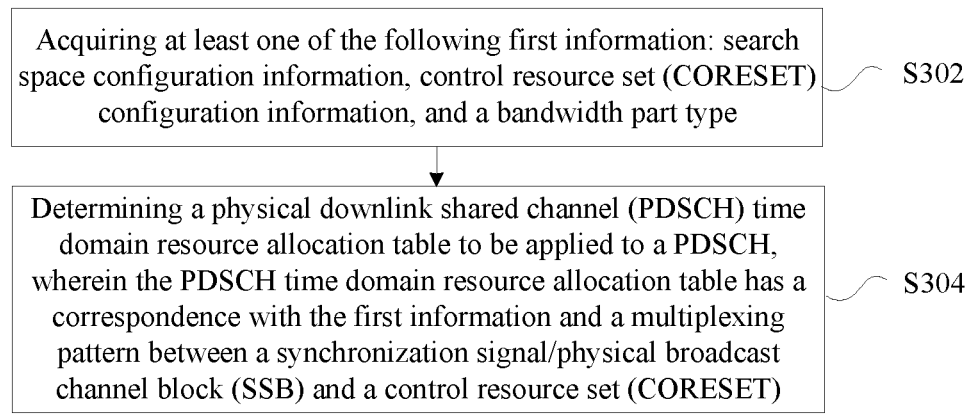
FIG. 3 is a flowchart of a time domain resource allocation method according to an embodiment of the present disclosure.

The embodiment provides a time domain resource allocation method running on a mobile terminal. FIG. 3 is a flowchart of the time domain resource allocation method according to an embodiment of the present disclosure. As shown in FIG. 3, the flow includes the following operations S302 and S304.

In operation S302, at least one of the following first information is acquired: search space configuration information, control resource set (CORESET) configuration information, and a bandwidth part type. The above CORESENT configuration information may be commonControlResourceSet.

In operation S304, a physical downlink shared channel (PDSCH) time domain resource allocation table to be applied to a PDSCH is determined, wherein the PDSCH time domain resource allocation table has a correspondence with the first information and a multiplexing pattern between a synchronization signal/physical broadcast channel block (SSB) and a CORESET.

The described solution may be applied to a receiving end, such as a mobile terminal. Alternatively, the solution may also be applied to a sending end. When being applied to the sending end, the meaning of "acquiring" in the described operation S302 can be understood as determining or generating at the sending end.

By means of the described operations, a terminal can acquire at least one of first information which includes search space configuration information, CORESET configuration information, and a bandwidth part type; and a PDSCH time domain resource allocation table is subsequently determined according to the first information and a multiplexing pattern between an SSB and a CORESET. By means of the solution, the problem in the related art that a solution for allocating a time domain resource to a physical downlink shared channel needs improving is solved. A terminal can determine a PDSCH time domain resource allocation table according to the solution, and further select a PDSCH time domain resource allocation.

In some embodiments, the operation of determining the PDSCH time domain resource allocation table to be applied to the PDSCH includes at least one of the following.

(1) The PDSCH time domain resource allocation table to be applied to the PDSCH is determined according to the multiplexing pattern between the SSB and the CORESET and the search space configuration information.

(2) The PDSCH time domain resource allocation table to be applied to the PDSCH is determined according to the multiplexing pattern between the SSB and the CORESET and the CORESET configuration information.

(3) The PDSCH time domain resource allocation table to be applied to the PDSCH is determined according to the multiplexing pattern between the SSB and the CORESET, the search space configuration information and the CORESET configuration information.

(4) The PDSCH time domain resource allocation table to be applied to the PDSCH is determined according to the multiplexing pattern between the SSB and the CORESET and the bandwidth part type.

(5) The PDSCH time domain resource allocation table to be applied to the PDSCH is determined according to the multiplexing pattern between the SSB and the CORESET, the bandwidth part type and the search space configuration information.

In some embodiments, the operation of determining the PDSCH time domain resource allocation table to be applied to the PDSCH according to the multiplexing pattern between the SSB and the CORESET and the search space configuration information includes at least one of the following.

(1) When a search space index configured in the search space configuration information is zero or no search space is configured in the search space configuration information, the PDSCH time domain resource allocation table to be applied is determined according to the multiplexing pattern between the SSB and the CORESET.

The operation of determining the PDSCH time domain resource allocation table to be applied according to the multiplexing pattern between the SSB and the CORESET may be implemented in the following manner. When the current multiplexing pattern between the SSB and CORRESET is pattern1, a default PDSCH time domain resource allocation table A (Default A) is applied to perform the current time domain resource allocation. When the current multiplexing pattern between the SSB and CORRESET is pattern2, a default PDSCH time domain resource allocation table B (Default B) is applied to perform the current time domain resource allocation. When the current multiplexing pattern between the SSB and CORRESET is pattern3, a default PDSCH time domain resource allocation table C (Default C) is applied to perform the current time domain resource allocation.

(2) When a search space index configured in the search space configuration information is not zero or a search space is configured, a default PDSCH time domain resource allocation table A (Default A) is applied as the PDSCH time domain resource allocation table.

In some embodiments, the operation of determining the PDSCH time domain resource allocation table to be applied to the PDSCH according to the multiplexing pattern between the SSB and the CORESET and the CORESET configuration information includes at least one of the following.

(1) When the CORESET configuration information is not configured, the PDSCH time domain resource allocation table to be applied is determined according to the multiplexing pattern between the SSB and the CORESET.

(2) When the CORESET configuration information is configured, a default PDSCH time domain resource allocation table A (Default A) is determined as the PDSCH time domain resource allocation table.

In some embodiments, the operation of determining the PDSCH time domain resource allocation table to be applied to the PDSCH according to the multiplexing pattern between the SSB and the CORESET, the search space configuration information and the CORESET configuration information includes at least one of the following.

(1) When a search space index configured in the search space configuration information is zero and the CORESET configuration information is not configured, the PDSCH time domain resource allocation table to be applied is determined according to the multiplexing pattern between the SSB and the CORESET.

(2) When a search space index configured in the search space configuration information is not zero or the CORESET configuration information is configured, a default PDSCH time domain resource allocation table A (Default A) is determined as the PDSCH time domain resource allocation table.

In some embodiments, the operation of determining the PDSCH time domain resource allocation table to be applied to the PDSCH according to the multiplexing pattern between the SSB and the CORESET, the search space configuration information and the CORESET configuration information includes at least one of the following.

(1) When a search space index configured in the search space configuration information is zero or the CORESET configuration information is not configured, the PDSCH time domain resource allocation table to be applied is determined according to the multiplexing pattern between the SSB and the CORESET.

(2) When a search space index configured in the search space configuration information is not zero and the CORESET configuration information is configured, a default PDSCH time domain resource allocation table A (Default A) is determined as the PDSCH time domain resource allocation table.

In some embodiments, the operation of determining the PDSCH time domain resource allocation table to be applied to the PDSCH according to the multiplexing pattern between the SSB and the CORESET and the bandwidth part type includes at least one of the following.

(1) When the bandwidth part type is an initial active downlink bandwidth part (initial active DL BWP), the PDSCH time domain resource allocation table to be applied is determined according to the multiplexing pattern between the SSB and the CORESET.

(2) When the bandwidth part type is a non-initial active downlink bandwidth part (non-initial active DL BWP), a default PDSCH time domain resource allocation table A (Default A) is determined as the PDSCH time domain resource allocation table.

In some embodiments, the operation of determining the PDSCH time domain resource allocation table to be applied to the PDSCH according to the multiplexing pattern between the SSB and the CORESET, the bandwidth part type and the search space configuration information includes at least one of the following.

(1) When the bandwidth part type is an initial active DL BWP, and a search space index configured in the search space configuration information is zero, the PDSCH time domain resource allocation table to be applied is determined according to the multiplexing pattern between the SSB and the CORESET.

(2) When the bandwidth part type is a non-initial active DL BWP, a default PDSCH time domain resource allocation table A (Default A) is determined as the PDSCH time domain resource allocation table; or, when the bandwidth part type is an initial active DL BWP and the search space index configured in the search space configuration information is not zero, a default PDSCH time domain resource allocation table A (Default A) is determined as the PDSCH time domain resource allocation table.

In some embodiments, the PDSCH time domain resource allocation table to be applied to the PDSCH is a set of PDSCH time domain resource allocations.

In some embodiments, after determining the PDSCH time domain resource allocation table to be applied to the PDSCH, the method may further include the following operation. According to the currently determined PDSCH time domain resource allocation table and a PDSCH time domain resource allocation index indicated in downlink control information, at least one of the following second information is received: paging information, other system information (OSI), and random access information. The PDSCH time domain resource allocation index corresponds to one PDSCH time domain resource allocation in the PDSCH time domain resource allocation table.

In some embodiments, indication information with a length of 4 bits may be used in the downlink control information to indicate which time domain resource allocation in the default PDSCH time domain resource allocation table is used.

According to another embodiment of the present disclosure, a time domain resource allocation method is provided, including operations 1 and 2 below.

In operation 1, at least one of the following first information is indicated: search space configuration information, control resource set (CORESET) configuration information, and a bandwidth part type.

In operation 2, a PDSCH time domain resource allocation is indicated in a PDSCH time domain resource allocation table that has a correspondence with the first information and a multiplexing pattern between a synchronization signal/physical broadcast channel block (SSB) and a control resource set (CORESET).

By means of the solution, a base station indicates at least one of first information which includes search space configuration information, CORESET configuration information, and a bandwidth part type; and a PDSCH time domain resource allocation table is subsequently indicated to a terminal according to the first information and a multiplexing pattern between an SSB and a CORESET. By means of the solution, the problem in the related art that the scheme of allocating a time domain resource to a physical downlink shared channel needs improving is solved, and a base station can indicate a PDSCH time domain resource allocation table according to the solution, and further indicate a PDSCH time domain resource allocation in the PDSCH time domain resource allocation table.

In some embodiments, the operation of indicating the PDSCH time domain resource allocation in the PDSCH time domain resource allocation table that has the correspondence with the first information and the multiplexing pattern between the SSB and the CORESET may include at least one of the following.

(1) The PDSCH time domain resource allocation table to be applied to the PDSCH is determined according to the multiplexing pattern between the SSB and the CORESET and the search space configuration information.

(2) The PDSCH time domain resource allocation table to be applied to the PDSCH is determined according to the multiplexing pattern between the SSB and the CORESET and the CORESET configuration information.

(3) The PDSCH time domain resource allocation table to be applied to the PDSCH is determined according to the multiplexing pattern between the SSB and the CORESET, the search space configuration information and the CORESET configuration information.

(4) The PDSCH time domain resource allocation table to be applied to the PDSCH is determined according to the multiplexing pattern between the SSB and the CORESET and the bandwidth part type.

(5) The PDSCH time domain resource allocation table to be applied to the PDSCH is determined according to the multiplexing pattern between the SSB and the CORESET, the bandwidth part type and the search space configuration information.

In some embodiments, the operation of determining the PDSCH time domain resource allocation table to be applied to the PDSCH according to the multiplexing pattern between the SSB and the CORESET and the search space configuration information includes at least one of the following.

(1) When a search space index configured in the search space configuration information is zero or no search space is configured in the search space configuration information, the PDSCH time domain resource allocation table to be applied is determined according to the multiplexing pattern between the SSB and the CORESET.

(2) When a search space index configured in the search space configuration information is not zero or a search space is configured, a default PDSCH time domain resource allocation table A (Default A) is determined as the PDSCH time domain resource allocation table.

In some embodiments, the operation of determining the PDSCH time domain resource allocation table to be applied to the PDSCH according to the multiplexing pattern between the SSB and the CORESET and the CORESET configuration information includes at least one of the following.

(1) When the CORESET configuration information is not configured, the PDSCH time domain resource allocation table to be applied is determined according to the multiplexing pattern between the SSB and the CORESET.

(2) When the CORESET configuration information is configured, a default PDSCH time domain resource allocation table A (Default A) is determined as the PDSCH time domain resource allocation table.

In some embodiments, the operation of determining the PDSCH time domain resource allocation table to be applied to the PDSCH according to the multiplexing pattern between the SSB and the CORESET, the search space configuration information and the CORESET configuration information includes at least one of the following.

(1) When a search space index configured in the search space configuration information is zero and the CORESET configuration information is not configured, the PDSCH time domain resource allocation table to be applied is determined according to the multiplexing pattern between the SSB and the CORESET.

(2) When a search space index configured in the search space configuration information is not zero or the CORESET configuration information is configured, a default PDSCH time domain resource allocation table A (Default A) is determined as the PDSCH time domain resource allocation table.

In some embodiments, the operation of determining the PDSCH time domain resource allocation table to be applied to the PDSCH according to the multiplexing pattern between the SSB and the CORESET, the search space configuration information and the CORESET configuration information includes at least one of the following.

(1) When a search space index configured in the search space configuration information is zero or the CORESET configuration information is not configured, the PDSCH time domain resource allocation table to be applied is determined according to the multiplexing pattern between the SSB and the CORESET.

(2) When a search space index configured in the search space configuration information is not zero and the CORESET configuration information is configured, a default PDSCH time domain resource allocation table A (Default A) is determined as the PDSCH time domain resource allocation table.

In some embodiments, the operation of determining the PDSCH time domain resource allocation table to be applied to the PDSCH according to the multiplexing pattern between the SSB and the CORESET and the bandwidth part type includes at least one of the following.

(1) When the bandwidth part type is an initial active DL BWP, the PDSCH time domain resource allocation table to be applied is determined according to the multiplexing pattern between the SSB and the CORESET.

(2) When the bandwidth part type is a non-initial active DL BWP, a default PDSCH time domain resource allocation table A (Default A) is determined as the PDSCH time domain resource allocation table.

In some embodiments, the operation of determining the PDSCH time domain resource allocation table to be applied to the PDSCH according to the multiplexing pattern between the SSB and the CORESET, the bandwidth part type and the search space configuration information includes at least one of the following.

(1) When the bandwidth part type is an initial active DL BWP, and a search space index configured in the search space configuration information is zero, the PDSCH time domain resource allocation table to be applied is determined according to the multiplexing pattern between the SSB and the CORESET.

(2) When the bandwidth part type is a non-initial active DL BWP, a default PDSCH time domain resource allocation table A (Default A) is determined as the PDSCH time domain resource allocation table; or when the bandwidth part type is an initial active DL BWP and the search space index configured in the search space configuration information is not zero, a default PDSCH time domain resource allocation table A (Default A) is determined as the PDSCH time domain resource allocation table.

In some embodiments, the PDSCH time domain resource allocation table applied to PDSCH refers to a set of PDSCH time domain resource allocations.

In some embodiments, the operation of determining the PDSCH time domain resource allocation in a PDSCH time domain resource allocation table that has a correspondence with the first information and the multiplexing pattern between the SSB and the CORESET includes the following operation. According to the currently determined PDSCH time domain resource allocation table and a PDSCH time domain resource allocation index indicated in downlink control information, at least one of the following second information is sent: paging information, other system information (OSI), and random access information. In the exemplary embodiments, the PDSCH time domain resource allocation index corresponds to one PDSCH time domain resource allocation in the currently determined PDSCH time domain resource allocation table.

Description will be given below with reference to other embodiments of the present disclosure.

In some embodiments, 16 time domain resource allocation patterns are defined in each table, and a currently used time domain resource allocation is indicated by 4 bits in downlink control information (DCI). With regard to other transmission information (such as paging information, other system information (OSI), random access, etc.), when a PDSCH time domain resource allocation table is not configured, the described default PDSCH time domain resource allocation table is also applicable to time domain resource allocation for the transmission information.

A problem to be solved by another embodiment of the present disclosure is that, with regard to time domain resource allocation of other information, when a PDSCH time domain resource allocation table is not configured, which one of three default PDSCH time domain resource allocation tables defined in the standard is used as a basis for time domain resource allocation.

As shown in FIG. 1, remaining minimum system information (RMSI) is also referred to as a system information block 1 (SIB1). An RMSI CORESET (control resource set) refers to a resource set for carrying an RMSI PDCCH. The standard supports time division multiplexing or frequency division multiplexing between the RMSI CORESET and the SS/PBCH block (short as SSB). In some embodiments, under pattern1, the RMSI CORESET and the SSB are time-division multiplexed, that is, the RMSI CORESET and the SSB occupy different time domain resources, and in the frequency domain dimension, the RMSI CORESET includes the SSB. Under pattern2 and pattern3, the SSB and the RMSI CORESET both occupy different frequency resources in a frequency domain dimension, and the difference between pattern2 and pattern3 lies in that under pattern2, the RMSI CORESET occupies symbols preceding the SSB in the time domain, while in pattern3 the RMSI CORESET occupies the symbol where the SSB is located in the time domain.

Correspondingly, the time domain resource allocations of the RMSI PDSCH respectively follow the following three tables (table 1, table 2, table 3). Table 1 is a default PDSCH time domain resource allocation table in the related art. Table 2 is a default PDSCH time domain resource allocation table in the related art. Table 3 is a default PDSCH time domain resource allocation table in the related art. In some embodiments, table 1 is applied when the RMSI CORESET and the SSB adopt the multiplexing pattern1, table 2 is applied when the RMSI CORESET and the SSB adopt the multiplexing pattern2; and table 3 is applied when the RMSI CORESET and the SSB adopt the multiplexing pattern3.

The default PDSCH time domain resource allocation table A (Default A) described in the embodiments of the present disclosure may be the described table 1, that is, when the RMSI CORESET and the SSB occupy different time domain resources and the RMSI CORESET contains the SSB in the frequency domain dimension (namely, the multiplexing pattern is pattern1), the corresponding PDSCH time domain resource allocation table is the default PDSCH time domain resource allocation table A (Default A) (table 1).

The default PDSCH time domain resource allocation table B (Default B) described in the embodiments of the present disclosure may be the described table 2, that is, when the SSB and the RMSI CORESET occupy different frequency resources in the frequency domain dimension and the RMSI CORESET occupies the symbols preceding the SSB in the time domain (namely, the multiplexing pattern is pattern2), the corresponding PDSCH time domain resource allocation table is the default PDSCH time domain resource allocation table B (Default B) (table 2).

The default PDSCH time domain resource allocation table C (Default C) described in the embodiments of the present disclosure may be the described table 3, that is, when the SSB and the RMSI CORESET occupy different frequency resources in the frequency domain dimension and the RMSI CORESET occupies the symbol where the SSB is located in the time domain (namely, the multiplexing pattern is pattern3), the corresponding PDSCH time domain resource allocation table is the default PDSCH time domain resource allocation table C (Default C) (table 3).

Each table (PDSCH time domain resource allocation table) includes 16 rows (some rows are reserved) corresponding to 16 time domain resource allocations. In each time domain resource allocation, there are mainly three parameters for indicating a time domain resource allocation position: a K0 for representing downlink scheduling timing, i.e. the number of time slots between a PDCCH and a corresponding PDSCH, in which K0=0 represents that the PDSCH and the PDCCH are in the same time slot; an S denoting a starting symbol index of the allocated PDSCH time domain resource; and an L representing the number of symbols occupied by the allocated PDSCH time domain resources. Two other columns of parameters are included in the table (PDSCH time domain resource allocation table), which are respectively PDSCH mapping types used for indicating to which type the current time domain resource allocation belongs, wherein Type A refers to slot based time domain resource allocation, and Type B refers to non-slot based time domain resource allocation. The DMRS-TypeA-Position is used for indicating a symbol where a PDSCH demodulation reference signal is located. Before reading the PDSCH time domain resource allocation indication in a PDCCH, a terminal has acquired a currently applied PDSCH DMRS position; therefore, when determining a specific time domain resource allocation according to the indication in the PDCCH, the terminal may perform the determination in combination with the current DMRS position information.

In some embodiments, the terminal acquires that the drs-Type A-Position is 2 and the multiplexing pattern is pattern1 from a MIB (Master information block). Furthermore, the terminal acquires that the time domain resource allocation row index is 1 in the time domain resource allocation domain of the RMSI PDCCH, and then the terminal searches the row index 1 of table 1 and finally determines that the time domain resource allocation of the RMSI PDSCH is K0=0, S=2, L=12.

TABLE 1

| Row index | dmrs-TypeA-Position | PDSCH mapping type | K0 | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

TABLE 2

| Row index | dmrs-TypeA-Position | PDSCH mapping type | K0 | S | L |
|---|---|---|---|---|---|
| 1 | 2, 3 | Type B | 0 | 2 | 2 |
| 2 | 2, 3 | Type B | 0 | 4 | 2 |
| 3 | 2, 3 | Type B | 0 | 6 | 2 |
| 4 | 2, 3 | Type B | 0 | 8 | 2 |
| 5 | 2, 3 | Type B | 0 | 10 | 2 |
| 6 | 2, 3 | Type B | 1 | 2 | 2 |
| 7 | 2, 3 | Type B | 1 | 4 | 2 |
| 8 | 2, 3 | Type B | 0 | 2 | 4 |
| 9 | 2, 3 | Type B | 0 | 4 | 4 |
| 10 | 2, 3 | Type B | 0 | 6 | 4 |
| 11 | 2, 3 | Type B | 0 | 8 | 4 |

TABLE 2-continued

| Row index | dmrs-TypeA-Position | PDSCH mapping type | K0 | S | L |
|---|---|---|---|---|---|
| 12 (Note 1) | 2, 3 | Type B | 0 | 10 | 4 |
| 13 (Note 1) | 2, 3 | Type B | 0 | 2 | 7 |
| 14 (Note 1) | 2 | Type A | 0 | 2 | 12 |
|  | 3 | Type A | 0 | 3 | 11 |
| 15 | 2, 3 | Type B | 1 | 2 | 4 |
| 16 |  | Reserved |  |  |  |

(Note 1):
If the PDSCH was scheduled with SI-RNTI in PDCCH Type0 common search space, the UE may assume that this PDSCH resource allocation is not applied

TABLE 3

| Row index | dmrs-Type A-Position | PDSCH mapping type | K0 | S | L |
|---|---|---|---|---|---|
| 1 (Note 1) | 2, 3 | Type B | 0 | 2 | 2 |
| 2 | 2, 3 | Type B | 0 | 4 | 2 |
| 3 | 2, 3 | Type B | 0 | 6 | 2 |
| 4 | 2, 3 | Type B | 0 | 8 | 2 |
| 5 | 2, 3 | Type B | 0 | 10 | 2 |
| 6 |  | Reserved |  |  |  |
| 7 |  | Reserved |  |  |  |
| 8 | 2, 3 | Type B | 0 | 2 | 4 |
| 9 | 2, 3 | Type B | 0 | 4 | 4 |
| 10 | 2, 3 | Type B | 0 | 6 | 4 |
| 11 | 2, 3 | Type B | 0 | 8 | 4 |
| 12 | 2, 3 | Type B | 0 | 10 | 4 |
| 13 (Note 1) | 2, 3 | Type B | 0 | 2 | 7 |
| 14 (Note 1) | 2 | Type A | 0 | 2 | 12 |
|  | 3 | Type A | 0 | 3 | 11 |
| 15 (Note 1) | 2, 3 | Type A | 0 | 0 | 6 |
| 16 (Note 1) | 2, 3 | Type A | 0 | 2 | 6 |

(Note 1):
The UE may assume that this PDSCH resource allocation is not used, if the PDSCH was scheduled with SI-RNTI in PDCCH Type0 common search space For other transmission information (such as paging information (namely, PDSCH carrying paging message), other system information (OSI) (namely, PDSCH carrying OSI), random access (namely, PDSCH carrying random access response in random access process, or PDSCH carrying MSG4 in random access process), etc.), when the PDSCH time domain resource allocation table is not configured via RRC signaling, the foregoing default PDSCH time domain resource allocation table is also applicable to time domain resource allocation for such transmission information.

For time domain resource allocation of other information, when a PDSCH time domain resource allocation table is not configured, which one of three default PDSCH time domain resource allocation tables defined in the standard is used as the PDSCH time domain resource allocation table will be discussed in detail in the subsequent embodiments.

Another embodiment of the present disclosure describes a method of determining a PDSCH time domain resource allocation table to be applied based on a search space configuration.

In this embodiment, with regard to other transmission information (including paging information (namely, a PDSCH carrying a paging message), other system information (OSI) (namely, a PDSCH carrying an OSI), random access (namely, a PDSCH carrying a random access response in a random access process, or a PDSCH carrying an MSG4 in a random access process), etc.), when a PDSCH time domain resource allocation table is not configured, the method for determining the PDSCH time domain resource allocation table also applies to such transmission information.

Table 4 is a first application table of a PDSCH time domain resource allocation table according to another embodiment of the present disclosure. As shown in table 4, taking OSI (namely, the RNTI type is SI-RNTI, and the PDCCH search space is Type0A common) as an example, when information transmission is paging or random access related downlink transmission, the method of this embodiment is also applicable. The default PDSCH time domain resource allocation table A/B/C (default A/B/C for short) in Table 4 respectively corresponds to Table 1/2/3 in the embodiment of the present disclosure.

When the pdsch-ConfigCommon information element of the SIB1 does not contain the pdsch-TimeDomainAllocationList (namely, the PDSCH time domain resource allocation table is not configured), if the SearchSpaceId corresponding to the searchSpaceOtherSystemInformation field in the PDCCH-ConfigCommon information element of the SIB1 is configured as SearchSpaceZero, then the applied PDSCH time domain resource allocation table is determined according to the multiplexing pattern between the SSB and the CORESET. That is, if the multiplexing pattern is pattern1, the default PDSCH time domain resource allocation table A (Default A) is adopted; if the multiplexing pattern is pattern2, the default PDSCH time domain resource allocation table B (Default B) is adopted; and if the multiplexing pattern is pattern3, the default PDSCH time domain resource allocation table C (Default C) is adopted.

If the SearchSpaceId configuration corresponding to the searchSpaceOtherSystemInformation in the PDCCH-ConfigCommon information element of the SIB1 is a value other than SearchSpaceZero, then the applied PDSCH time domain resource allocation table is the default PDSCH time domain resource allocation table A (Default A) regardless of the multiplexing pattern currently used between the SSB and the CORESET.

TABLE 4

| RNTI | PDCCH search space | SS/PBCH block and CORESET multiplexing pattern | pdsch-ConfigCommon includes pdsch-TimeDomainAllocationList | pdsch-Config includes pdsch-TimeDomainAllocationList | PDSCH time domain resource allocation to apply |
|---|---|---|---|---|---|
| SI-RNTI | Type0A common | 1 | No | — | Default A (if SearchSpaceZero is configured) |
|  |  | 2 | No | — | Default B (if SearchSpaceZero is configured) |

TABLE 4-continued

| RNTI | PDCCH search space | SS/PBCH block and CORESET multiplexing pattern | pdsch-ConfigCommon includes pdsch-TimeDomainAllocationList | pdsch-Config includes pdsch-TimeDomainAllocationList | PDSCH time domain resource allocation to apply |
|---|---|---|---|---|---|
| | | 3 | No | — | Default C (if SearchSpaceZero is configured) |
| | | 1, 2, 3 | No | — | Default A (if SearchSpaceId other than SearchSpaceZero is configured) |
| | | 1, 2, 3 | Yes | — | pdsch-TimeDomainAllocationList shaded in pdschConfigCommon |

It should be noted that although the foregoing table is described by taking an OSI (namely, the RNTI is an SI-RNTI, and the PDCCH search track is a Type 0A command) as an example, a similar table is also applicable to paging (namely, the RNTI is a P-RNTI, and the PDCCH search track is a Type 2 command) and random access RA (namely, the RNTI is an RA-RNTI or a TC-RNTI, and the PDCCH search space is a Type 1 common), and the content of the table can be defined correspondingly.

It should be noted that, SearchSpaceZero is a search space configuration adopted by the RMSI PDCCH, and if the search space of the OSI/paging/RA PDCCH is also configured to be SearchSpaceZero, it represents that the OSI/paging/RA PDCCH and the RMSI PDCCH share the same search space.

By using the method for determining a PDSCH time domain resource allocation table specified in the embodiments of the present disclosure, the following advantage can be achieved: when a search space is the same as an SIB1, in order to satisfy frequency division multiplexing of a PDSCH and a corresponding SSB in a multiplexing pattern 2/3, symbols occupied by the PDSCH are limited to symbols where the SSB is located, and a default PDSCH time domain resource allocation table B/C (Default B/C) is defined in order to adapt to a constraint relationship of the time domain symbols. Therefore, if the OSI/paging/RA PDCCH and the RMSI PDCCH share the same search space, the PDSCH time domain resource allocation tables in various multiplexing patterns should apply the default PDSCH time domain resource allocation table A/B/C (default A/B/C for short) respectively.

However, if the paging/OSI/RA is configured with an independent search space (namely, a search space other than the Search Space Zero), there is no restriction on the symbols where the PDSCH is located; therefore, a more flexible default PDSCH time domain resource allocation table A (Default A) should be adopted.

Another embodiment of the present disclosure describes a method of determining a PDSCH time domain resource allocation table to be applied based on a Control Resource SET (CORESET) configuration.

In this embodiment, with regard to other transmission information (such as paging information (namely, a PDSCH carrying a paging message), other system information (OSI) (namely, a PDSCH carrying an OSI), random access (namely, a PDSCH carrying a random access response in a random access process, or a PDSCH carrying an MSG4 in a random access process), etc.), when a PDSCH time domain resource allocation table is not configured, the method for determining the PDSCH time domain resource allocation table also applies to such transmission information.

Table 5 is a second application table of the PDSCH time domain resource allocation table according to another embodiment of the present disclosure. As shown in table 5, the method of this embodiment is also applicable when the information transmission is paging or random access related downlink transmission, and this embodiment takes the application of the method to the OSI (namely, the RNTI type is SI-RNTI, and the PDCCH search space is Type0A common) as an example. The default PDSCH time domain resource allocation table A/B/C (default A/B/C for short) in Table 5 respectively corresponds to Table 1/2/3 in an embodiment of the present disclosure.

When the pdsch-ConfigCommon information element of SIB1 does not contain the pdsch-TimeDomainAllocationList (namely, the PDSCH time domain resource allocation table is not configured), if the PDCCH-ConfigCommon information element of SIB1 does not contain the commonControlResourceSet (in this case, OSI/paging/RA uses the same CORESET as that of SIB1 by default), then the applied PDSCH time domain resource allocation table is determined according to the multiplexing pattern between the SSB and the CORESET. That is, if the multiplexing pattern is pattern1, the default PDSCH time domain resource allocation table A (Default A) is adopted; if the multiplexing pattern is pattern2, the default PDSCH time domain resource allocation table B (Default B) is adopted; and if the multiplexing pattern is pattern3, the default PDSCH time domain resource allocation table C (Default C) is adopted.

If the PDCCH-ConfigCommon information element of SIB1 contains a commonControlResourceSet (in such a case, the network side configures for the terminal a ControlResourceSet with a ControlResourceSet with a ControlResourceSet Id which is not 0), no matter which multiplexing pattern is currently used between the SSB and the CORESET, the default PDSCH time domain resource allocation table used is default A.

TABLE 5

| RNTI | PDCCH search space | SS/PBCH block and CORESET multiplexing pattern | pdsch-ConfigCommon includes pdsch-TimeDomainAllocationList | pdsch-Config includes pdsch-TimeDomainAllocationList | PDSCH time domain resource allocation to apply |
|---|---|---|---|---|---|
| SI-RNTI | Type0A common | 1 | No | — | Default A(if commonControlResourceSet is not configured) |
| | | 2 | No | — | Default B (if commonControlResourceSet is not configured) |
| | | 3 | No | — | Default C(if commonControlResourceSet is not configured) |
| | | 1, 2, 3 | No | — | Default A (if commonControlResourceSet is configured) |
| | | 1, 2, 3 | Yes | — | pdsch-TimeDomainAllocationList provided in pdschConfigCommon |

It should be noted that, the CORESET with index 0 is the CORESET used by the SIB1, and if the control resource set of the OSI/paging/RA PDCCH is not configured, it represents that the control resource set of the OSI/paging/RA PDCCH is the same as that of the SIB1 PDCCH. If the network side configures another CORESET for the OSI/paging/RA PDCCH, the index of this CORESET is not 0, that is, the CORESET is different from that of the SIB1 PDCCH.

Another embodiment of the present disclosure describes a method of determining a PDSCH time domain resource allocation table to be applied based on a search space and a COntrol REsource SET (CORESET) configuration.

In this embodiment, with regard to other transmission information (such as paging information (namely, a PDSCH carrying a paging message), other system information (OSI) (namely, a PDSCH carrying an OSI), random access (namely, a PDSCH carrying a random access response in a random access process, or a PDSCH carrying an MSG4 in a random access process), etc.), when a PDSCH time domain resource allocation table is not configured, the method for determining the PDSCH time domain resource allocation table also applies to such transmission information.

Table 6 is a third application table of the PDSCH time domain resource allocation table according to another embodiment of the present disclosure. As shown in table 6, the method of this embodiment is also applicable when the information transmission is paging or random access related downlink transmission, and the embodiment takes the application of the method to the OSI (namely, the RNTI type is SI-RNTI, and the PDCCH search space is Type0A common) as an example. The default PDSCH time domain resource allocation table A/B/C (default A/B/C for short) in table 6 respectively corresponds to Table 1/2/3 in an embodiment of the present disclosure.

When the pdsch-ConfigCommon information element of SIB1 does not include pdsch-TimeDomainAllocationList (namely, PDSCH time domain resource allocation table is not configured): if the PDCCH-ConfigCommon information unit of SIB1 does not include the common Control Resource Set (in such a case, OSI/paging/RA uses the same CORESET as SIB1 by default), and the SearchSpaceId corresponding to the searchSpaceOtherSystemInformation domain is configured as SearchSpaceZero, then the applied PDSCH time domain resource allocation table is determined according to the multiplexing pattern between the SSB and the CORESET. That is, if the multiplexing pattern is pattern1, the default PDSCH time domain resource allocation table A (Default A) is adopted; if the multiplexing pattern is pattern2, the default PDSCH time domain resource allocation table B (Default B) is adopted; and if the multiplexing pattern is pattern3, the default PDSCH time domain resource allocation table C (Default C) is adopted.

If the PDCCH-ConfigCommon information element of SIB1 contains a commonControlResourceSet (in this case, the network side configures for the terminal a ControlResourceSet with a ControlResourceSet with a ControlResourceSet Id that is not 0), or the SearchSpaceId corresponding to the searchSpace OtherSystemInformation field is configured to be a value other than SearchSpaceZero, no matter which multiplexing pattern is currently used between the SSB and the CORESET, the applied PDSCH time domain resource allocation table is the default PDSCH time domain resource allocation table A (Default A).

TABLE 6

| RNTI | PDCCH search space | SS/PBCH block and CORESET multiplexing pattern | pdsch-ConfigCommon includes pdsch-TimeDomainAllocationList | pdsch-Config includes pdsch-TimeDomainAllocationList | PDSCH time domain resource allocation to apply |
|---|---|---|---|---|---|
| SI-RNTI | Type0A common | 1 | No | — | Default A(if commonControlResourceSet is not configured, and SearchSpaceZero is configured) |

TABLE 6-continued

| RNTI | PDCCH search space | SS/PBCH block and CORESET multiplexing pattern | pdsch-ConfigCommon includes pdsch-TimeDomainAllocationList | pdsch-Config includes pdsch-TimeDomainAllocationList | PDSCH time domain resource allocation to apply |
|------|--------------------|------------------------------------------------|----------------------------------------------------------|------------------------------------------------------|-------------------------------------------------|
|      |                    | 2                                              | No                                                       | —                                                    | Default B(if commonControlResourceSet is not configured, and SearchSpaceZero is configured) |
|      |                    | 3                                              | No                                                       | —                                                    | Default C(if commonControlResourceSet is not configured, and SearchSpaceZero is configured) |
|      |                    | 1, 2, 3                                        | No                                                       | —                                                    | Default A(if commonControlResourceSet be configured, or SearchSpaceId other than SearchSpaceZero is configured) |
|      |                    | 1, 2, 3                                        | Yes                                                      | —                                                    | pdsch-TimeDomainAllocationList provided in pdschConfigCommon |

It should be noted that, the CORESET with index 0 is the CORESET used by the SIB1, and if the control resource set of the OSI/paging/RA PDCCH is not configured, it represents that the control resource set of the OSI/paging/RA PDCCH is the same as that of the SIB1 PDCCH. If the network side configures another CORESET for the OSI/paging/RA PDCCH, the index of this CORESET is not 0, that is, the CORESET is different from that of the SIB1 PDCCH.

SearchSpaceZero is a search space configuration adopted by the SIB1 PDCCH, and if the search space of the OSI/paging/RA PDCCH is also configured to be SearchSpaceZero, it represents that the OSI/paging/RA PDCCH and the RMSI PDCCH share the same search space.

By using the method for determining the PDSCH time domain resource allocation table specified in the embodiments of the present disclosure, the following advantage can be achieved: when a search space and a control resource set are both the same as SIB1, in order to satisfy frequency division multiplexing of a PDSCH and a corresponding SSB in a multiplexing pattern 2/3, symbols occupied by the PDSCH are limited to symbols where the SSB is located, and a default PDSCH time domain resource allocation table B/C (Default B/C) is defined in order to adapt to a constraint relationship of such time domain symbols. Therefore, if the OSI/paging/RA PDCCH and the RMSI PDCCH share the same search space, the PDSCH time domain resource allocation tables in various multiplexing patterns should apply the default PDSCH time domain resource allocation table A/B/C (default A/B/C for short) respectively.

However, if the paging/OSI/RA is configured with an independent search space (namely, a search space other than SearchSpaceZero), or configured with another control resource set (namely, a common control resource set other than the common control resource set 0), there is no restriction on the symbols where the PDSCH is located, and therefore a more flexible default PDSCH time domain resource allocation table A (Default A) should be adopted.

Another embodiment of the present disclosure describes another method for determining a PDSCH time domain resource allocation table to be applied based on a search space and a control resource set (CORESET) configuration.

In this embodiment, with regard to other transmission information (such as paging information (namely, a PDSCH carrying a paging message), other system information (OSI) (namely, a PDSCH carrying an OSI), random access (namely, a PDSCH carrying a random access response in a random access process, or a PDSCH carrying an MSG4 in a random access process), etc.), when a PDSCH time domain resource allocation table is not configured, the method for determining the PDSCH time domain resource allocation table also applies to such transmission information.

Table 7 is a fourth application table of the PDSCH time domain resource allocation table according to another embodiment of the present disclosure. As shown in table 7, the embodiment takes the application of the method to OSI (namely, the RNTI type is SI-RNTI, and the PDCCH search space is Type0A common) as an example, when the information transmission is paging or random access related downlink transmission, the method of this embodiment is also applicable. The default PDSCH time domain resource allocation table A/B/C (default A/B/C for short) in Table 7 respectively corresponds to Table 1/2/3 in an embodiment of the present disclosure.

When the pdsch-ConfigCommon information element of SIB1 does not include the pdsch-TimeDomainAllocationList (namely, PDSCH time domain resource allocation table is not configured): if the PDCCH-ConfigCommon information element of the SIB1 does not include the commonControlResourceSet (in this case, the OSI/paging/RA uses the same CORESET as the SIB1 by default), or, if the SearchSpaceId corresponding to the searchSpaceOtherSystemInformation domain is configured to be SearchSpaceZero, then the default PDSCH time domain resource allocation table to be applied is determined according to the multiplexing pattern between the SSB and the CORESET. That is, if the multiplexing pattern is pattern1, the default PDSCH time domain resource allocation table A (Default A) is adopted; if the multiplexing pattern is pattern2, the default PDSCH time domain resource allocation table B (Default B) is adopted; and if the multiplexing pattern is pattern3, the default PDSCH time domain resource allocation table C (Default C) is adopted.

If the PDCCH-ConfigCommon information element of SIB1 contains a commonControlResourceSet (in this case, the network side configures for the terminal a ControlResourceSet with a ControlResourceSet with a ControlResourceSetId that is not 0), and the SearchSpaceId corresponding to the searchSpaceOtherSystemInformation field is configured to be a value other than SearchSpaceZero, then no matter which multiplexing pattern is currently used between the SSB and the CORESET, the applied PDSCH time domain resource allocation table is the default PDSCH time domain resource allocation table A (Default A).

TABLE 7

| RNTI | PDCCH search space | SS/PBCH block and CORESET multiplexing pattern | pdsch-ConfigCommon includes pdsch-TimeDomainAllocationList | pdsch-Config includes pdsch-TimeDomainAllocationList | PDSCH time domain resource allocation to apply |
|---|---|---|---|---|---|
| SI-RNTI | Type0A common | 1 | No | — | Default A (if commonControlResourceSet is not configured, or SearchSpaceZero is configured) |
| | | 2 | No | — | Default B (if commonControlResourceSet is not configured, or SearchSpaceZero is configured) |
| | | 3 | No | — | Default C (if commonControlResourceSet is not configured, or SearchSpaceZero is configured) |
| | | 1, 2, 3 | No | — | Default A (if commonControlResourceSet be configured, and SearchSpaceId other than SearchSpaceZero is configured) |
| | | 1, 2, 3 | Yes | — | pdsch-TimeDomainAllocationList provided in pdschConfigCommon |

It should be noted that, the CORESET with index 0 is the CORESET used by the SIB1, and if the control resource set of the OSI/paging/RA PDCCH is not configured, it represents that the control resource set of the OSI/paging/RA PDCCH is the same as that of the SIB1 PDCCH. If the network side configures another CORESET for the OSI/paging/RA PDCCH, the index of this CORESET is not 0, that is, the CORESET is different from that of the SIB1 PDCCH.

SearchSpaceZero is a search space configuration adopted by the SIB1 PDCCH, and if the search space of the OSI/paging/RA PDCCH is also configured to be SearchSpaceZero, it represents that the OSI/paging/RA PDCCH and the RMSI PDCCH share the same search space.

By using the method for determining the PDSCH time domain resource allocation table specified in the embodiments of the present disclosure, the following advantage can be achieved: when one of a search space or a control resource set is the same as SIB1, in order to satisfy frequency division multiplexing of a PDSCH and a corresponding SSB under a multiplexing pattern 2/3, symbols occupied by the PDSCH are limited to symbols where the SSB is located, and a default PDSCH time domain resource allocation table B/C (Default B/C) is defined in order to adapt to a constraint relationship of such time domain symbols. Therefore, if the OSI/paging/RA PDCCH and the RMSI PDCCH share the same search space, the PDSCH time domain resource allocation tables in various multiplexing patterns should apply the default PDSCH time domain resource allocation table A/B/C (default A/B/C for short) respectively.

However, if the paging/OSI/RA is configured with an independent search space (namely, a search space other than SearchSpaceZero) and configured with another control resource set (namely, a commonControlResourceSet other than the commonControlResourceSet0), there is no restriction on the symbols where the PDSCH is located, and therefore a more flexible default PDSCH time domain resource allocation table A (Default A) should be adopted.

Another embodiment of the present disclosure describes a method of determining a PDSCH time domain resource allocation table to be applied based on a current bandwidth part (BWP) type.

In this embodiment, with regard to other transmission information (such as paging information (namely, a PDSCH carrying a paging message), other system information (OSI) (namely, a PDSCH carrying an OSI), random access (namely, a PDSCH carrying a random access response in a random access process, or a PDSCH carrying an MSG4 in a random access process), etc.), when a PDSCH time domain resource allocation table is not configured, the method for determining the PDSCH time domain resource allocation table also applies to such transmission information.

Table 8 is a fifth application table of the PDSCH time domain resource allocation table according to another embodiment of the present disclosure. As shown in Table 8, the method of this embodiment is also applicable when information transmission is paging or random access related downlink transmission, and the embodiment takes the application of the method to an OSI (namely, the RNTI type is SI-RNTI, and the PDCCH search space is Type0A common) as an example. The default PDSCH time domain resource allocation table A/B/C (default A/B/C for short) in Table 8 respectively corresponds to Table 1/2/3 in an embodiment of the present disclosure.

When the pdsch-ConfigCommon information element of the SIB1 does not contain the pdsch-TimeDomainAllocationList (namely, the PDSCH time domain resource allocation table is not configured), if the current BWP is an initial active DL BWP, the applied PDSCH time domain resource allocation table is determined according to the multiplexing pattern between the SSB and the CORESET. That is, if the multiplexing pattern is pattern1, the default PDSCH time domain resource allocation table A (Default A) is adopted; if the multiplexing pattern is pattern2, the default PDSCH time domain resource allocation table B (Default B) is adopted; and if the multiplexing pattern is pattern3, the default PDSCH time domain resource allocation table C (Default C) is adopted.

If the current BWP is a non-initial active DL BWP, that is, for BWP other than a certain non-initial activated downlink BWP, no matter which multiplexing pattern is currently used between the SSB and the CORESET, the applied PDSCH time domain resource allocation table is the default PDSCH time domain resource allocation table A (Default A).

TABLE 8

| RNTI | PDCCH search space | SS/PBCH block and CORESET multiplexing pattern | pdsch-ConfigCommon includes pdsch-TimeDomainAllocationList | pdsch-Config includes pdsch-TimeDomainAllocationList | PDSCH time domain resource allocation to apply |
|---|---|---|---|---|---|
| SI-RNTI | Type0A common | 1 | No | — | Default A (for initial active DL BWP) |
| | | 2 | No | — | Default B for initial active DL BWP, and SearchSpaceZero is configured) |
| | | 3 | No | — | Default C (for initial active DL BWP, and SearchSpaceZero is configured) |
| | | 1, 2, 3 | No | — | Default A(for non-initial active DL BWP) |
| | | 1, 2, 3 | Yes | — | pdsch-TimeDomainAllocationList provided in pdschConfigCommon |

It should be noted that, in the table, the initial active DL BWP refers to an initial activated downlink BWP, or an activated BWP completely overlapping with the initial activated downlink BWP. The non-initial active DL BWP refers to an active BWP except for the initial activated downlink BWP, or an active BWP that does not completely overlap with the initial activated downlink BWP.

Another embodiment of the present disclosure describes a method of determining a PDSCH time domain resource allocation table to be applied based on a current Bandwidth part (BWP) type and a search space configuration.

In this embodiment, with regard to other transmission information (such as paging information (namely, a PDSCH carrying a paging message), other system information (OSI) (namely, a PDSCH carrying an OSI), random access (namely, a PDSCH carrying a random access response in a random access process, or a PDSCH carrying an MSG4 in a random access process), etc.), when a PDSCH time domain resource allocation table is not configured, the method for determining the PDSCH time domain resource allocation table also applies to such transmission information.

Table 9 is a sixth application table of the PDSCH time domain resource allocation table according to another embodiment of the present disclosure. As shown in table 9, the method of this embodiment is also applicable when the information transmission is paging or random access related downlink transmission, and the embodiment takes the application of the method to the OSI (namely, the RNTI type is SI-RNTI, and the PDCCH search space is Type0A common) as an example. The default PDSCH time domain resource allocation table A/B/C (default A/B/C for short) in Table 9 respectively corresponds to table 1/2/3 in an embodiment of the present disclosure.

When the pdsch-ConfigCommon information element of the SIB1 does not contain the pdsch-TimeDomainAllocationList (namely, the PDSCH time domain resource allocation table is not configured): if the SearchSpaceId corresponding to the searchSpaceOtherSystemInformation field in the PDCCH-ConfigCommon information element of the SIB1 is configured as SearchSpaceZero, and the current BWP is an initial active DL BWP, the applied PDSCH time domain resource allocation table is determined according to the multiplexing pattern between the SSB and the CORESET. That is, if the multiplexing pattern is pattern1, the default PDSCH time domain resource allocation table A (Default A) is used; if the multiplexing pattern is pattern2, the default PDSCH time domain resource allocation table B (Default B) is adopted; and if the multiplexing pattern is pattern3, the default PDSCH time domain resource allocation table C (Default C) is adopted.

If the current BWP is a non-initial active DL BWP, that is, a BWP other than a certain non-initial activated downlink BWP, or the current BWP is an initial active DL BWP, and if the SearchSpaceId corresponding to the searchSpaceOtherSystemInformation is a value other than a SearchSpaceZero in the PDCCH-ConfigCommon information element of the SIB1, no matter which multiplexing pattern is currently used between the SSB and the CORESET, the applied PDSCH time domain resource allocation table is the default PDSCH time domain resource allocation table A (Default A).

TABLE 9

| RNTI | PDCCH search space | SS/PBCH block and CORESET multiplexing pattern | pdsch-ConfigCommon includes pdsch-TimeDomainAllocationList | pdsch-Config includes pdsch-TimeDomainAllocationList | PDSCH time domain resource allocation to apply |
|---|---|---|---|---|---|
| SI-RNTI | Type0A common | 1 | No | — | Default A (for initial active DL BWP, and SearchSpaceZero is configured) |
| | | 2 | No | — | Default B (for initial active DL BWP, and SearchSpaceZero is configured) |

TABLE 9-continued

| RNTI | PDCCH search space | SS/PBCH block and CORESET multiplexing pattern | pdsch-ConfigCommon includes pdsch-TimeDomainAllocationList | pdsch-Config includes pdsch-TimeDomainAllocationList | PDSCH time domain resource allocation to apply |
|------|--------------------|------------------------------------------------|--------------------------------------------------------------|--------------------------------------------------------|------------------------------------------------|
| | | 3 | No | — | Default C (for initial active DL BWP, and SearchSpaceZero is configured) |
| | | 1, 2, 3 | No | — | Default A (for non-initial active DL BWP, or for initial active DL BWP and SearchSpaceId other than SearchSpaceZero is configured) |
| | | 1, 2, 3 | Yes | — | pdsch-TimeDomainAllocationList provided in pdschConfigCommon |

It should be noted that, SearchSpaceZero is a search space configuration adopted by the RMSIPDCCH, and if the search space of the OSI/paging/RA PDCCH is also configured to be SearchSpaceZero, it represents that the OSI/paging/RA PDCCH and the RMSIPDCCH share the same search space.

In the table, the initial active DL BWP refers to an initial activated downlink BWP, or an activated BWP completely overlapping with the initial activated downlink BWP. The non-initial active DL BWP refers to an active BWP except for the initial activated downlink BWP, or an active BWP that does not completely overlap with the initial activated downlink BWP.

Another embodiment of the present disclosure describes a method of determining a PDSCH time domain resource allocation table to be applied based on a search space configuration.

In this embodiment, with regard to other transmission information (such as paging information (namely, a PDSCH carrying a paging message), other system information (OSI) (namely, a PDSCH carrying an OSI), random access (namely, a PDSCH carrying a random access response in a random access process, or a PDSCH carrying an MSG4 in a random access process), etc.), when a PDSCH time domain resource allocation table is not configured, the method for determining the PDSCH time domain resource allocation table also applies to such transmission information.

Table 10 is a seventh application table of a PDSCH time domain resource allocation table according to another embodiment of the present disclosure. As shown in table 10, the method of this embodiment is also applicable when information transmission is paging or random access related downlink transmission, and the embodiment takes the application of the method to an OSI (namely, the RNTI type is SI-RNTI, and the PDCCH search space is Type0A common) as an example. The default PDSCH time domain resource allocation table A/B/C (default A/B/C for short) in table 10 respectively corresponds to table 1/2/3 in an embodiment of the present disclosure.

When the pdsch-ConfigCommon information element of the SIB1 does not contain the pdsch-TimeDomainAllocationList (namely, the PDSCH time domain resource allocation table is not configured): if the searchSpaceOthersystemInformation is not configured in the PDCCH-ConfigCommon information element of the SIB1, the applied PDSCH time domain resource allocation table is determined according to the multiplexing pattern between the SSB and the CORESET. That is, if the multiplexing pattern is pattern1, the default PDSCH time domain resource allocation table A (Default A) is adopted; if the multiplexing pattern is pattern2, the default PDSCH time domain resource allocation table B (Default B) is adopted; and if the multiplexing pattern is pattern3, the default PDSCH time domain resource allocation table C (Default C) is adopted.

If the searchSpaceOthersystemInformation is configured in the PDCCH-ConfigCommon information element of the SIB1 (namely, a search space different from the SIB1 PDCCH is configured for the OSI PDCCH), no matter which multiplexing pattern is currently used between the SSB and the CORESET, the applied PDSCH time domain resource allocation table is the default PDSCH time domain resource allocation table A (Default A).

TABLE 10

| RNTI | PDCCH search space | SS/PBCH block and CORESET multiplexing pattern | pdsch-ConfigCommon includes pdsch-TimeDomainAllocationList | pdsch-Config includes pdsch-TimeDomainAllocationList | PDSCH time domain resource allocation to apply |
|------|--------------------|------------------------------------------------|--------------------------------------------------------------|--------------------------------------------------------|------------------------------------------------|
| SI-RNTI | Type0A common | 1 | No | — | Default A (if searchSpaceOtherSystemInformation is not configured) |
| | | 2 | No | — | Default B (if searchSpaceOtherSystemInformation is not configured) |
| | | 3 | No | — | Default C (if searchSpaceOtherSystemInformation is not configured) |

TABLE 10-continued

| RNTI | PDCCH search space | SS/PBCH block and CORESET multiplexing pattern | pdsch-ConfigCommon includes pdsch-TimeDomainAllocationList | pdsch-Config includes pdsch-TimeDomainAllocationList | PDSCH time domain resource allocation to apply |
|---|---|---|---|---|---|
| | | 1, 2, 3 | No | — | Default A (if searchSpaceOtherSystemInformation is not configured) |
| | | 1, 2, 3 | Yes | — | pdsch-TimeDomainAllocationList shaded in pdschConfigCommon |

It should be noted that, if the SearchSpace OtherSystemInformation is not configured, it represents that the search space of the OSI PDCCH has the same configuration as that of the SIB1 PDCCH.

By using the method for determining the PDSCH time domain resource allocation table specified in the embodiments of the present disclosure, the following advantage can be achieved: when a search space is the same as an SIB1, in order to satisfy frequency division multiplexing of a PDSCH and a corresponding SSB in the multiplexing pattern 2/3, symbols occupied by the PDSCH are limited to symbols where the SSB is located, and a default PDSCH time domain resource allocation table B/C (Default B/C) is defined in order to adapt to a constraint relationship of the time domain symbols. Therefore, if the OSI PDCCH shares the same search space with the SIB1 PDCCH, the PDSCH time domain resource allocation tables in various multiplexing patterns should apply the default PDSCH time domain resource allocation table A/B/C (default A/B/C for short), respectively.

However, if the OSI PDCCH is configured with an independent search space (namely, a search space other than SearchSpaceZero), there is no restriction on the symbols where the PDSCH is located, and therefore, a more flexible default PDSCH time domain resource allocation table A (Default A) should be adopted.

The present solution provides a time domain resource allocation method. Two methods for determining the PDSCH time domain resource allocation table are defined, and according to different configurations of a search space/control resource set/bandwidth part of a physical downlink control channel (PDCCH) of paging/other system information, a method for determining the physical downlink shared channel (PDSCH) time domain resource allocation table applied to a corresponding PDSCH can be determined.

By means of determining the PDSCH time domain resource allocation table according to the method provided in the embodiments of the present disclosure, unreasonable limitations to time domain resource allocation can be effectively avoided, the flexibility of time domain resource allocation can be improved, and the communication performance can be further improved.

By means of the present disclosure, a terminal can acquire at least one of first information which includes search space configuration information, CORESET configuration information, and a bandwidth part type; and a PDSCH time domain resource allocation table is subsequently determined according to the first information and a multiplexing pattern between an SSB and a CORESET. By means of the solution, the problem in the related art that a solution for allocating a time domain resource to a physical downlink shared channel needs improving is solved. A terminal can determine a PDSCH time domain resource allocation table according to the solution, and further select a PDSCH time domain resource allocation.

Through the description of the above implementations, those having ordinary skill in the art can understand that the method according to the above embodiment may be implemented by means of software plus a necessary general hardware platform, and of course, may also be implemented through hardware, but in many cases, the former is a better implementation. Based on such understanding, the essence of technical solution of the embodiments of the present disclosure, or in other words, the part of the technical solutions making contributions to the conventional art, may be embodied in the form of a software product stored in a storage medium (such as a Read-Only Memory (ROM)/Random Access Memory (RAM), a magnetic disk and an optical disc), including a number of instructions for enabling a terminal device (which may be a mobile phone, a computer, a server, or a network device, etc.) to perform the methods described in various embodiments of the present disclosure.

An embodiment of the present disclosure further provides a time domain resource allocation apparatus. The apparatus is used to implement the above embodiments and exemplary implementations, and the details having been described will not be repeated. As used below, the term "module" may implement a combination of software and/or hardware of a predetermined function. Although the apparatus described in the following embodiments is preferably implemented in software, the implementation in hardware or a combination of software and hardware is also possible and contemplated.

According to another embodiment of the present disclosure, a time domain resource allocation apparatus is provided, including an acquiring module and a determining module.

The acquiring module is configured to acquire at least one of the following first information: search space configuration information; control resource set (CORESET) configuration information; and a bandwidth part type.

The determining module is configured to determine a physical downlink shared channel (PDSCH) time domain resource allocation table to be applied to the PDSCH, wherein the PDSCH time domain resource allocation table has a correspondence with the first information and a multiplexing pattern between a synchronization signal/physical broadcast channel block (SSB) and a control resource set (CORESET).

By means of the described operations, a terminal can acquire at least one of first information which includes search space configuration information, CORESET configuration information, and a bandwidth part type; and a PDSCH time domain resource allocation table is subsequently determined according to the first information and a multiplexing pattern between an SSB and a CORESET. By means of the solution, the problem in the related art that a solution for allocating a time domain resource to a physical downlink shared channel needs improving is solved. A terminal can determine a PDSCH time domain resource allocation table according to the solution, and further select a PDSCH time domain resource allocation.

In some embodiments, the operation of determining the PDSCH time domain resource allocation table to be applied to the PDSCH includes at least one of the following.

(1) The PDSCH time domain resource allocation table to be applied to the PDSCH is determined according to the multiplexing pattern between the SSB and the CORESET and the search space configuration information.

(2) The PDSCH time domain resource allocation table to be applied to the PDSCH is determined according to the multiplexing pattern between the SSB and the CORESET and the CORESET configuration information.

(3) The PDSCH time domain resource allocation table to be applied to the PDSCH is determined according to the multiplexing pattern between the SSB and the CORESET, the search space configuration information and the CORESET configuration information.

(4) The PDSCH time domain resource allocation table to be applied to the PDSCH is determined according to the multiplexing pattern between the SSB and the CORESET and the bandwidth part type.

(5) The PDSCH time domain resource allocation table to be applied to the PDSCH is determined according to the multiplexing pattern between the SSB and the CORESET, the bandwidth part type and the search space configuration information.

In some embodiments, the operation of determining the PDSCH time domain resource allocation table to be applied to the PDSCH according to the multiplexing pattern between the SSB and the CORESET and the search space configuration information includes at least one of the following.

(1) When a search space index configured in the search space configuration information is zero or no search space is configured in the search space configuration information, the PDSCH time domain resource allocation table to be applied is determined according to the multiplexing pattern between the SSB and the CORESET.

The operation of determining the PDSCH time domain resource allocation table to be applied according to the multiplexing pattern between the SSB and the CORESET may include the following operations. When the current multiplexing pattern between the SSB and CORRESET is pattern1, a default PDSCH time domain resource allocation table A (Default A) is applied to perform the current time domain resource allocation. When the current multiplexing pattern between the SSB and CORRESET is Pattern2, the default PDSCH time domain resource allocation table B (Default B) is applied to perform the current time domain resource allocation. When the current multiplexing pattern between the SSB and CORRESET is Pattern3, the default PDSCH time domain resource allocation table C (Default C) is applied to perform the current time domain resource allocation.

(2) When a search space index configured in the search space configuration information is not zero or a search space is configured, the default PDSCH time domain resource allocation table A (Default A) is applied as the PDSCH time domain resource allocation table.

In some embodiments, the operation of determining the PDSCH time domain resource allocation table to be applied to the PDSCH according to the multiplexing pattern between the SSB and the CORESET and the CORESET configuration information includes at least one of the following.

(1) When the CORESET configuration information is not configured, the PDSCH time domain resource allocation table to be applied is determined according to the multiplexing pattern between the SSB and the CORESET.

(2) When the CORESET configuration information is configured, a default PDSCH time domain resource allocation table A (Default A) is applied as the PDSCH time domain resource allocation table.

In some embodiments, the operation of determining the PDSCH time domain resource allocation table to be applied to the PDSCH according to the multiplexing pattern between the SSB and the CORESET, the search space configuration information and the CORESET configuration information includes at least one of the following.

(1) When a search space index configured in the search space configuration information is zero and the CORESET configuration information is not configured, the PDSCH time domain resource allocation table to be applied is determined according to the multiplexing pattern between the SSB and the CORESET.

(2) When a search space index configured in the search space configuration information is not zero or the CORESET configuration information is configured, a default PDSCH time domain resource allocation table A (Default A) is determined as the PDSCH time domain resource allocation table.

In some embodiments, the operation of determining the PDSCH time domain resource allocation table to be applied to the PDSCH according to the multiplexing pattern between the SSB and the CORESET, the search space configuration information and the CORESET configuration information includes at least one of the following.

(1) When a search space index configured in the search space configuration information is zero or the CORESET configuration information is not configured, the PDSCH time domain resource allocation table to be applied is determined according to the multiplexing pattern between the SSB and the CORESET.

(2) When a search space index configured in the search space configuration information is not zero and the CORESET configuration information is configured, a default PDSCH time domain resource allocation table A (Default A) is determined as the PDSCH time domain resource allocation table.

In some embodiments, the operation of determining the PDSCH time domain resource allocation table to be applied to the PDSCH according to the multiplexing pattern between the SSB and the CORESET and the bandwidth part type includes at least one of the following.

(1) When the bandwidth part type is an initial active DL BWP, the PDSCH time domain resource allocation table to be applied is determined according to the multiplexing pattern between the SSB and the CORESET.

(2) When the bandwidth part type is a non-initial active DL BWP, a default PDSCH time domain resource allocation table A (Default A) is applied as the PDSCH time domain resource allocation table.

In some embodiments, the operation of determining the PDSCH time domain resource allocation table to be applied to the PDSCH according to the multiplexing pattern between the SSB and the CORESET, the bandwidth part type and the search space configuration information includes at least one of the following.

(1) When the bandwidth part type is an initial active DL BWP, and a search space index configured in the search space configuration information is zero, the PDSCH time domain resource allocation table to be applied is determined according to the multiplexing pattern between the SSB and the CORESET.

(2) When the bandwidth part type is a non-initial active DL BWP, a default PDSCH time domain resource allocation table A (Default A) is determined as the PDSCH time domain resource allocation table; or, when the bandwidth part type is an initial active DL BWP and the search space index configured in the search space configuration information is not zero, a default PDSCH time domain resource allocation table A (Default A) is applied as the PDSCH time domain resource allocation table.

In some embodiments, the PDSCH time domain resource allocation table to be applied to the PDSCH is a set of PDSCH time domain resource allocations.

In some embodiments, after determining the PDSCH time domain resource allocation table to be applied to the PDSCH, the method may further include: according to the currently determined PDSCH time domain resource allocation table and a PDSCH time domain resource allocation index indicated in downlink control information, at least one of the following second information is received: paging information, other system information (OSI), and random access information. The PDSCH time domain resource allocation index corresponds to one PDSCH time domain resource allocation in the PDSCH time domain resource allocation table.

In some embodiments, indication information with a length of 4 bits may be used in the downlink control information to indicate which time domain resource allocation in the default PDSCH time domain resource allocation table is used.

According to another embodiment of the present disclosure, a time domain resource allocation apparatus is provided, including a first indicating module and a second indicating module.

The first indicating module is configured to indicate at least one of the following first information: search space configuration information, control resource set (CORESET) configuration information, and a bandwidth part type.

The second indicating module is configured to indicate PDSCH time domain resource allocation in a PDSCH time domain resource allocation table that has a correspondence with the first information and a multiplexing pattern between a synchronization signal/physical broadcast channel block (SSB) and a control resource set (CORESET).

By means of the solution, a base station indicates at least one of first information which includes search space configuration information, CORESET configuration information, and a bandwidth part type; and a PDSCH time domain resource allocation table is subsequently indicated to a terminal according to the first information and a multiplexing pattern between an SSB and a CORESET. By means of the solution, the problem in the related art that the scheme of allocating a time domain resource to a physical downlink shared channel needs improving is solved, and a base station can indicate a PDSCH time domain resource allocation table according to the solution, and further indicate a PDSCH time domain resource allocation in the PDSCH time domain resource allocation table.

In some embodiments, the operation of indicating the PDSCH time domain resource allocation in the PDSCH time domain resource allocation table that has the correspondence with the first information and the multiplexing pattern between the SSB and the CORESET includes at least one of the following.

(1) The PDSCH time domain resource allocation table to be applied to the PDSCH is determined according to the multiplexing pattern between the SSB and the CORESET and the search space configuration information.

(2) The PDSCH time domain resource allocation table to be applied to the PDSCH is determined according to the multiplexing pattern between the SSB and the CORESET and the CORESET configuration information.

(3) The PDSCH time domain resource allocation table to be applied to the PDSCH is determined according to the multiplexing pattern between the SSB and the CORESET, the search space configuration information and the CORESET configuration information.

(4) The PDSCH time domain resource allocation table to be applied to the PDSCH is determined according to the multiplexing pattern between the SSB and the CORESET and the bandwidth part type.

(5) The PDSCH time domain resource allocation table to be applied to the PDSCH is determined according to the multiplexing pattern between the SSB and the CORESET, the bandwidth part type and the search space configuration information.

In some embodiments, the operation of determining the PDSCH time domain resource allocation table to be applied to the PDSCH according to the multiplexing pattern between the SSB and the CORESET and the search space configuration information includes at least one of the following.

(1) When a search space index configured in the search space configuration information is zero or no search space is configured in the search space configuration information, the PDSCH time domain resource allocation table to be applied is determined according to the multiplexing pattern between the SSB and the CORESET.

(2) When a search space index configured in the search space configuration information is not zero or a search space is configured, a default PDSCH time domain resource allocation table A (Default A) is determined as the PDSCH time domain resource allocation table.

In some embodiments, the operation of determining the PDSCH time domain resource allocation table to be applied to the PDSCH according to the multiplexing pattern between the SSB and the CORESET and the CORESET configuration information includes at least one of the following.

(1) When the CORESET configuration information is not configured, the PDSCH time domain resource allocation table to be applied is determined according to the multiplexing pattern between the SSB and the CORESET.

(2) When the CORESET configuration information is configured, a default PDSCH time domain resource allocation table A (Default A) is determined as the PDSCH time domain resource allocation table.

In some embodiments, the operation of determining the PDSCH time domain resource allocation table to be applied to the PDSCH according to the multiplexing pattern between the SSB and the CORESET, the search space configuration information and the CORESET configuration information includes at least one of the following.

(1) When a search space index configured in the search space configuration information is zero and the CORESET configuration information is not configured, the PDSCH time domain resource allocation table to be applied is determined according to the multiplexing pattern between the SSB and the CORESET.

(2) When a search space index configured in the search space configuration information is not zero or the CORESET configuration information is configured, a default PDSCH time domain resource allocation table A (Default A) is determined as the PDSCH time domain resource allocation table.

In some embodiments, the operation of determining the PDSCH time domain resource allocation table to be applied to the PDSCH according to the multiplexing pattern between the SSB and the CORESET, the search space configuration information and the CORESET configuration information includes at least one of the following.

(1) When a search space index configured in the search space configuration information is zero or the CORESET configuration information is not configured, the PDSCH time domain resource allocation table to be applied is determined according to the multiplexing pattern between the SSB and the CORESET.

(2) When a search space index configured in the search space configuration information is not zero and the CORESET configuration information is configured, a default PDSCH time domain resource allocation table A (Default A) is determined as the PDSCH time domain resource allocation table.

In some embodiments, the operation of determining the PDSCH time domain resource allocation table to be applied to the PDSCH according to the multiplexing pattern between the SSB and the CORESET and the bandwidth part type includes at least one of the following.

(1) When the bandwidth part type is an initial active DL BWP, the PDSCH time domain resource allocation table to be applied is determined according to the multiplexing pattern between the SSB and the CORESET.

(2) When the bandwidth part type is a non-initial active DL BWP, a default PDSCH time domain resource allocation table A (Default A) is determined as the PDSCH time domain resource allocation table.

In some embodiments, the operation of determining the PDSCH time domain resource allocation table to be applied to the PDSCH according to the multiplexing pattern between the SSB and the CORESET, the bandwidth part type and the search space configuration information includes at least one of the following.

(1) When the bandwidth part type is an initial active DL BWP, and a search space index configured in the search space configuration information is zero, the PDSCH time domain resource allocation table to be applied is determined according to the multiplexing pattern between the SSB and the CORESET.

(2) When the bandwidth part type is a non-initial active DL BWP, a default PDSCH time domain resource allocation table A (Default A) is determined as the PDSCH time domain resource allocation table; or when the bandwidth part type is an initial active DL BWP and the search space index configured in the search space configuration information is not zero, a default PDSCH time domain resource allocation table A (Default A) is determined as the PDSCH time domain resource allocation table.

In some embodiments, the PDSCH time domain resource allocation table applied to PDSCH refers to a set of PDSCH time domain resource allocations.

In some embodiments, the operation of determining the PDSCH time domain resource allocation from the PDSCH time domain resource allocation table that has a correspondence with the first information and the multiplexing pattern between the SSB and the CORESET includes: according to the currently determined PDSCH time domain resource allocation table, and a PDSCH time domain resource allocation index indicated in downlink control information, at least one of the following second information is sent: paging information, other system information (OSI), and random access information. The PDSCH time domain resource allocation index corresponds to one PDSCH time domain resource allocation in the currently determined PDSCH time domain resource allocation table.

It is to be noted that each of the above modules may be implemented by software or hardware. For the latter, the modules may be implemented by, but not limited to, either of the following manners: the above modules are all located in the same processor; or, the above modules are located in different processors in any combination form respectively.

An embodiment of the present disclosure further provides a storage medium. In some embodiments, the storage medium may be configured to store program codes for executing the following operations. In operation S1, at least one of the following first information is acquired: search space configuration information, control resource set (CORESET) configuration information, and a bandwidth part type. In operation S2, a physical downlink shared channel (PDSCH) time domain resource allocation table to be applied to the PDSCH is determined, wherein the PDSCH time domain resource allocation table has a correspondence with the first information and a multiplexing pattern between a synchronization signal/physical broadcast channel block (SSB) and a control resource set (CORESET).

In some embodiments, the storage medium may include, but is not limited to, any medium that can store program codes, such as a USB flash disk, a Read-Only Memory (ROM), a Random Access Memory (RAM), a removable hard disk, a magnetic disk, or an optical disk.

Embodiments of the present disclosure further provide an electronic apparatus, including a memory and a processor. The memory stores a computer program. The processor is configured to run the computer program to execute operations in any one of the method embodiments.

In some embodiments, the electronic apparatus may further include a transmission apparatus and an input/output device, wherein the transmission apparatus is connected to the processor, and the input/output device is connected to the processor.

In some embodiments, the processor may be configured to execute the following operations by a computer program. In operation S1, at least one of the following first information is acquired: search space configuration information, control resource set (CORESET) configuration information, and a bandwidth part type. In operation S2, a physical downlink shared channel (PDSCH) time domain resource allocation table to be applied to the PDSCH is determined, wherein the PDSCH time domain resource allocation table has a correspondence with the first information and a multiplexing pattern between a synchronization signal/physical broadcast channel block (SSB) and a control resource set (CORESET).

Optionally, specific implementations for the present embodiment may refer to the examples described in the above embodiments and alternative implementations, and details are not repeated in the present embodiment.

It is apparent that a person skilled in the art shall understand that all of the above-mentioned modules or operations in the present disclosure may be implemented by using a general computation apparatus, may be centralized on a single computation apparatus or may be distributed on a network composed of multiple computation apparatuses. Optionally, they may be implemented by using executable program codes of the computation apparatuses. Thus, they may be stored in a storage apparatus and executed by the computation apparatuses, the shown or described operations may be executed in a sequence different from this sequence under certain conditions, or they are manufactured into each integrated circuit module respectively, or multiple modules or operations therein are manufactured into a single integrated circuit module. Thus, the embodiments of the present disclosure are not limited to any specific hardware and software combination.

The above is only the exemplary embodiments of the present disclosure, not intended to limit the present disclosure. As will occur to those having ordinary skill in the art, the present disclosure is susceptible to various modifications and changes. Any modifications, equivalent replacements, improvements and the like made within the principle of the present disclosure shall fall within the scope of protection of the present disclosure.

The invention claimed is:

1. A time domain resource allocation method performed by a time domain resource allocation apparatus, comprising:
  acquiring at least one of the following first information: search space configuration information, control resource set (CORESET) configuration information, and a bandwidth part type;
  determining a physical downlink shared channel (PDSCH) time domain resource allocation table to be applied to a PDSCH, wherein the PDSCH time domain resource allocation table has a correspondence with the first information and a multiplexing pattern between a synchronization signal/physical broadcast channel block (SSB) and a CORESET, wherein determining the PDSCH time domain resource allocation table to be to be applied to the PDSCH comprises at least one of the following:
  determining, according to the multiplexing pattern between the SSB and the CORESET and the search space configuration information, the PDSCH time domain resource allocation table to be applied to the PDSCH;
  determining, according to the multiplexing pattern between the SSB and the CORESET and the CORESET configuration information, the PDSCH time domain resource allocation table to be applied to the PDSCH;
  determining, according to the multiplexing pattern between the SSB and the CORESET, the search space configuration information and the CORESET configuration information, the PDSCH time domain resource allocation table to be applied to the PDSCH;
  determining, according to the multiplexing pattern between the SSB and the CORESET and the bandwidth part type, the PDSCH time domain resource allocation table to be applied to the PDSCH; and
  determining, according to the multiplexing pattern between the SSB and the CORESET, the bandwidth part type and the search space configuration information, the PDSCH time domain resource allocation table to be applied to the PDSCH, wherein determining, according to the multiplexing pattern between the SSB and the CORESET and the search space configuration information, the PDSCH time domain resource allocation table to be applied to the PDSCH comprises at least one of the following:
    when a search space index configured in the search space configuration information is zero or no search space is configured in the search space configuration information, determining the PDSCH time domain resource allocation table to be applied according to the multiplexing pattern between the SSB and the CORESET; and
    when the search space index configured in the search space configuration information is not zero or a search space is configured in the search space configuration information, determining a default PDSCH time domain resource allocation table A as the PDSCH time domain resource allocation table.

2. The method according to claim 1, wherein determining, according to the multiplexing pattern between the SSB and the CORESET and the CORESET configuration information, the PDSCH time domain resource allocation table to be applied to the PDSCH comprises at least one of the following:
  when the CORESET configuration information is not configured, determining the PDSCH time domain resource allocation table to be applied according to the multiplexing pattern between the SSB and the CORESET; and
  when the CORESENT configuration information is configured, determining a default PDSCH time domain resource allocation table A as the PDSCH time domain resource allocation table.

3. The method according to claim 1, wherein determining, according to the multiplexing pattern between the SSB and the CORESET, the search space configuration information and the CORESET configuration information, the PDSCH time domain resource allocation table to be applied to the PDSCH comprises at least one of the following:
  when a search space index configured in the search space configuration information is zero and the CORESET configuration information is not configured, determining the PDSCH time domain resource allocation table to be applied according to the multiplexing pattern between the SSB and the CORESET; and
  when the search space index configured in the search space configuration information is not zero or the CORESET configuration information is configured, determining a default PDSCH time domain resource allocation table A as the PDSCH time domain resource allocation table.

4. The method according to claim 1, wherein determining, according to the multiplexing pattern between the SSB and the CORESET, the search space configuration information and the CORESET configuration information, the PDSCH time domain resource allocation table to be applied to the PDSCH comprises at least one of the following:
  when a search space index configured in the search space configuration information is zero or the CORESET configuration information is not configured, determining the PDSCH time domain resource allocation table to be applied according to the multiplexing pattern between the SSB and the CORESET; and
  when the search space index configured in the search space configuration information is not zero and the CORESET configuration information is configured, determining a default PDSCH time domain resource allocation table A as the PDSCH time domain resource allocation table.

5. The method according to claim 1, wherein determining, according to the multiplexing pattern between the SSB and the CORESET and the bandwidth part type, the PDSCH time domain resource allocation table to be applied to the PDSCH comprises at least one of the following:
  when the bandwidth part type is an initial active downlink bandwidth part (initial active DL BWP), determining the PDSCH time domain resource allocation table to be applied according to the multiplexing pattern between the SSB and the CORESET; and when the bandwidth part type is a non-initial active downlink bandwidth part (non-initial active DL BWP), determining a default PDSCH time domain resource allocation table A as the PDSCH time domain resource allocation table.

6. The method according to claim 1, wherein determining, according to the multiplexing pattern between the SSB and the CORESET, the bandwidth part type and the search space configuration information, the PDSCH time domain resource allocation table to be applied to the PDSCH comprises at least one of the following:
   when the bandwidth part type is an initial active downlink bandwidth part (initial active DL BWP) and a search space index configured in the search space configuration information is zero, determining the PDSCH time domain resource allocation table to be applied according to the multiplexing pattern between the SSB and the CORESET; and
   when the bandwidth part type is a non-initial active downlink bandwidth part (non-initial active DL BWP), determining a default PDSCH time domain resource allocation table A as the PDSCH time domain resource allocation table; or, when the bandwidth part type is an initial active DL BWP and the search space index configured in the search space configuration information is not zero, determining the default PDSCH time domain resource allocation table A as the PDSCH time domain resource allocation table.

7. The method according to claim 1, wherein after determining the PDSCH time domain resource allocation table to be applied to the PDSCH, the method further comprises:
   receiving, according to the currently determined PDSCH time domain resource allocation table and a PDSCH time domain resource allocation index indicated in downlink control information, at least one of the following second information:
   paging information, other system information (OSI), and random access information;
   wherein the PDSCH time domain resource allocation index corresponds to one PDSCH time domain resource allocation in the PDSCH time domain resource allocation table.

8. A time domain resource allocation method performed by a time domain resource allocation apparatus, comprising:
   indicating at least one of the following first information:
   search space configuration information, control resource set (CORESET) configuration information, and a bandwidth part type;
   indicating PDSCH time domain resource allocation in a PDSCH time domain resource allocation table that has a correspondence with the first information and a multiplexing pattern between a synchronization signal/physical broadcast channel block (SSB) and a CORESET, wherein indicating the PDSCH time domain resource allocation in the PDSCH time domain resource allocation table that has the correspondence with the first information and the multiplexing pattern between the SSB and the CORESET comprises at least one of the following:
   determining, according to the multiplexing pattern between the SSB and the CORESET and the search space configuration information, the PDSCH time domain resource allocation table to be applied to the PDSCH;
   determining, according to the multiplexing pattern between the SSB and the CORESET and the CORESET configuration information, the PDSCH time domain resource allocation table to be applied to the PDSCH;
   determining, according to the multiplexing pattern between the SSB and the CORESET, the search space configuration information and the CORESET configuration information, the PDSCH time domain resource allocation table to be applied to the PDSCH;
   determining, according to the multiplexing pattern between the SSB and the CORESET and the bandwidth part type, the PDSCH time domain resource allocation table to be applied to the PDSCH; and
   determining, according to the multiplexing pattern between the SSB and the CORESET, the bandwidth part type and the search space configuration information, the PDSCH time domain resource allocation table to be applied to the PDSCH, wherein determining, according to the multiplexing pattern between the SSB and the CORESET and the search space configuration information, the PDSCH time domain resource allocation table to be applied to the PDSCH comprises at least one of the following:
   when a search space index configured in the search space configuration information is zero or no search space is configured in the search space configuration information, determining the PDSCH time domain resource allocation table to be applied according to the multiplexing pattern between the SSB and the CORESET; and
   when the search space index configured in the search space configuration information is not zero or a search space is configured in the search space configuration information, determining a default PDSCH time domain resource allocation table A as the PDSCH time domain resource allocation table.

9. The method according to claim 8, wherein determining, according to the multiplexing pattern between the SSB and the CORESET and the CORESET configuration information, the PDSCH time domain resource allocation table to be applied to the PDSCH comprises at least one of the following:
   when the CORESET configuration information is not configured, determining the PDSCH time domain resource allocation table to be applied according to the multiplexing pattern between the SSB and the CORESET; and
   when the CORESET configuration information is configured, determining a default PDSCH time domain resource allocation table A as the PDSCH time domain resource allocation table.

10. The method according to claim 8, wherein determining, according to the multiplexing pattern between the SSB and the CORESET, the search space configuration information and the CORESET configuration information, the PDSCH time domain resource allocation table to be applied to the PDSCH comprises at least one of the following:
   when a search space index configured in the search space configuration information is zero and the CORESET configuration information is not configured, determining the PDSCH time domain resource allocation table to be applied according to the multiplexing pattern between the SSB and the CORESET; and
   when the search space index configured in the search space configuration information is not zero or the CORESET configuration information is configured, determining a default PDSCH time domain resource allocation table A as the PDSCH time domain resource allocation table.

11. The method according to claim 8, wherein determining, according to the multiplexing pattern between the SSB and the CORESET, the search space configuration information and the CORESET configuration information, the PDSCH time domain resource allocation table to be applied to the PDSCH comprises at least one of the following:

when a search space index configured in the search space configuration information is zero or the CORESET configuration information is not configured, determining the PDSCH time domain resource allocation table to be applied according to the multiplexing pattern between the SSB and the CORESET; and when the search space index configured in the search space configuration information is not zero and the CORESET configuration information is configured, determining a default PDSCH time domain resource allocation table A as the PDSCH time domain resource allocation table.

12. The method according to claim 8, wherein determining, according to the multiplexing pattern between the SSB and the CORESET and the bandwidth part type, the PDSCH time domain resource allocation table to be applied to the PDSCH comprises at least one of the following:

when the bandwidth part type is an initial active downlink bandwidth part (initial active DL BWP), determining the PDSCH time domain resource allocation table to be applied according to the multiplexing pattern between the SSB and the CORESET; and when the bandwidth part type is a non-initial active downlink bandwidth part (non-initial active DL BWP), determining a default PDSCH time domain resource allocation table A as the PDSCH time domain resource allocation table.

13. The method according to claim 8, wherein determining, according to the multiplexing pattern between the SSB and the CORESET, the bandwidth part type and the search space configuration information, the PDSCH time domain resource allocation table to be applied to the PDSCH comprises at least one of the following:

when the bandwidth part type is an initial active downlink bandwidth part (initial active DL BWP) and a search space index configured in the search space configuration information is zero, determining the PDSCH time domain resource allocation table to be applied according to the multiplexing pattern between the SSB and the CORESET;

when the bandwidth part type is a non-initial active downlink bandwidth part (non-initial active DL BWP), determining a default PDSCH time domain resource allocation table A as the PDSCH time domain resource allocation table; or when the bandwidth part type is the initial active DL BWP and the search space index configured in the search space configuration information is not zero, determining the default PDSCH time domain resource allocation table A as the PDSCH time domain resource allocation table.

14. The method according to claim 8, wherein determining the PDSCH time domain resource allocation in the PDSCH time domain resource allocation table that has the correspondence with the first information and the multiplexing pattern between the SSB and the CORESET comprises:

sending, according to the currently determined PDSCH time domain resource allocation table and a PDSCH time domain resource allocation index indicated in downlink control information, at least one of the following second information:

paging information, other system information (OSI), and random access information;

wherein the PDSCH time domain resource allocation index corresponds to one PDSCH time domain resource allocation in the currently determined PDSCH time domain resource allocation table.

15. A time domain resource allocation apparatus, comprising a memory storing instructions and a processor in communication with the memory, wherein the processor is configured to execute the instructions to:

acquire at least one of the following first information: search space configuration information; control resource set (CORESET) configuration information; and a bandwidth part type; and determine a physical downlink shared channel (PDSCH) time domain resource allocation table to be applied to a PDSCH, wherein the PDSCH time domain resource allocation table has a correspondence with the first information and a multiplexing pattern between a synchronization signal/physical broadcast channel block (SSB) and a CORESET, wherein the processor is configured to execute the instructions to determine the PDSCH time domain resource allocation table to be to be applied to the PDSCH comprises at least one of the following:

determine, according to the multiplexing pattern between the SSB and the CORESET and the search space configuration information, the PDSCH time domain resource allocation table to be applied to the PDSCH;

determine, according to the multiplexing pattern between the SSB and the CORESET and the CORESET configuration information, the PDSCH time domain resource allocation table to be applied to the PDSCH;

determine, according to the multiplexing pattern between the SSB and the CORESET, the search space configuration information and the CORESET configuration information, the PDSCH time domain resource allocation table to be applied to the PDSCH;

determine, according to the multiplexing pattern between the SSB and the CORESET and the bandwidth part type, the PDSCH time domain resource allocation table to be applied to the PDSCH; and determine, according to the multiplexing pattern between the SSB and the CORESET, the bandwidth part type and the search space configuration information, the PDSCH time domain resource allocation table to be applied to the PDSCH, wherein determine, according to the multiplexing pattern between the SSB and the CORESET and the search space configuration information, the PDSCH time domain resource allocation table to be applied to the PDSCH comprises at least one of the following:

when a search space index configured in the search space configuration information is zero or no search space is configured in the search space configuration information, determine the PDSCH time domain resource allocation table to be applied according to the multiplexing pattern between the SSB and the CORESET; and when the search space index configured in the search space configuration information is not zero or a search space is configured in the search space configuration information, determine a default PDSCH time domain resource allocation table A as the PDSCH time domain resource allocation table.

16. A time domain resource allocation apparatus, comprising a memory storing instructions and a processor in communication with the memory, wherein the processor is configured to execute the instructions to perform the method according to claim 8.

\* \* \* \* \*